(12) United States Patent
Vazquez et al.

(10) Patent No.: US 11,330,037 B2
(45) Date of Patent: May 10, 2022

(54) METHOD AND SYSTEM FOR STREAMING DATA OVER A NETWORK

(71) Applicant: BARCO N.V., Kortrijk (BE)

(72) Inventors: Fernando Luis Bordallo Vazquez, Alicante (ES); Moreno Carlo Naitana, Auderghem (BE); Peter Gerard Paula Ramon, Assebroek (BE)

(73) Assignee: BARCO N.V., Kortrijk (BE)

( * ) Notice: Subject to any disclaimer, the term of this patent is extended or adjusted under 35 U.S.C. 154(b) by 0 days.

(21) Appl. No.: 16/623,062

(22) PCT Filed: Jun. 18, 2018

(86) PCT No.: PCT/EP2018/066136
§ 371 (c)(1),
(2) Date: Dec. 16, 2019

(87) PCT Pub. No.: WO2018/229301
PCT Pub. Date: Dec. 20, 2018

(65) Prior Publication Data
US 2020/0274914 A1    Aug. 27, 2020

(30) Foreign Application Priority Data

Jun. 16, 2017  (EP) .................................... 17176506
Jul. 28, 2017  (EP) .................................... 17183896
Aug. 25, 2017  (EP) .................................... 17188000

(51) Int. Cl.
*H04L 67/02*     (2022.01)
*G06F 3/0482*    (2013.01)
(Continued)

(52) U.S. Cl.
CPC .......... *H04L 67/02* (2013.01); *G06F 3/0482* (2013.01); *G06F 3/04842* (2013.01);
(Continued)

(58) Field of Classification Search
CPC ..... H04L 67/02; H04L 67/16; H04L 12/2805; H04L 67/2809; G06F 3/0482; G06F 3/04842; H04W 84/18; G06Q 10/101
See application file for complete search history.

(56) References Cited

U.S. PATENT DOCUMENTS 7,249,053 B2 *  7/2007  Wohlers ................ G06Q 30/02
                                                      705/14.73
2002/0085030 A1 *  7/2002  Ghani ..................... G09B 7/00
                                                      715/751
(Continued)

FOREIGN PATENT DOCUMENTS

WO      2008133555 A1    11/2008

OTHER PUBLICATIONS

NPL-Zoom Help Center (Zoom Help Center, retrieved from waybackmachine on Aug. 7, 2021, https://web.archive.org/web/20161209145221/https://support.zoom.us/hc/en-us/articles/213756303-Polling-for-meetings, wayback capture dated Dec. 9, 2016, hereinafter NPLZoom) (Year: 2016).*

(Continued)

*Primary Examiner* — Michael A Keller
(74) *Attorney, Agent, or Firm* — Hamre, Schumann, Mueller & Larson, P.C.

(57) ABSTRACT

A system and method for collaboration e.g. by configuring network devices for streaming electronic media data over a computer network. The network includes type 1- and type 2 network devices and the data can be streamed from a type 1 network device to a type 2 network device according to an electronic value. A use-case includes a collection of such electronic values. Such a system or method can be used for combining a digital interactive dialog window with generic (Continued)

web content shown by web browsers. The digital interactive dialog window can be overlaid onto the web content in an ad-hoc manner.

24 Claims, 10 Drawing Sheets

(51) Int. Cl.
    *G06F 3/04842*     (2022.01)
    *H04L 67/51*     (2022.01)
    *H04W 84/18*     (2009.01)
    *G06Q 10/10*     (2012.01)

(52) U.S. Cl.
    CPC ..... *G06Q 10/1093* (2013.01); *G06Q 10/1095* (2013.01); *H04L 67/16* (2013.01); *H04W 84/18* (2013.01)

(56) References Cited

U.S. PATENT DOCUMENTS

| | | |
|---|---|---|
| 2005/0277102 A1 | 12/2005 | Gillette et al. |
| 2008/0209330 A1 | 8/2008 | Cruver |
| 2009/0259736 A1 | 10/2009 | Chang et al. |
| 2012/0258435 A1 | 10/2012 | Tee et al. |
| 2016/0070897 A1* | 3/2016 | Lu ..................... G06F 3/04883 345/174 |
| 2017/0134793 A1* | 5/2017 | Harb ................. H04N 21/6125 |
| 2017/0162072 A1* | 6/2017 | Horseman ........... A61B 5/0205 |

OTHER PUBLICATIONS

European Office Action in corresponding European Application No. 18734769.5, dated Oct. 8, 2020.
International Search Report and Written Opinion in corresponding PCT/EP2018/066136, dated Jan. 23, 2019.
Second Written Opinion in corresponding PCT/EP2018/066136, dated Jul. 22, 2019.
International Preliminary Report on Patentability in corresponding PCT/EP2018/066136, dated Sep. 12, 2019.
Ramin Firoozye, "Talk Funnel Semi-Modal (Transparent) Dialogs on the iPhone," Sep. 29, 2009, http://ramin.firoozye.com/2009/09/29/semi-modal-transparent-dialogs-on-the-iphone (retrieved on Sep. 2, 2019).

* cited by examiner

METHOD AND SYSTEM FOR STREAMING DATA OVER A NETWORK

The present invention relates to a system, method, devices, software and computer programs for collaboration distributed over different locations. One location may have a moderator moderating the collaboration session with participants in the one location and other participants in remote locations. The present invention also relates to a systems, methods, devices, software and computer programs for collaboration by adding interactive dialog windows to existing content.

BACKGROUND

Setting up a network for collaboration within or across multiple physical locations can be a tedious task. Conventional methods comprise customized connections between devices enabling a certain use case and leave little possibilities for easily adapting to implement other use cases. For each new use case to be served, equipment needs to be reconfigured and possibly reprogrammed with settings appropriate for the specific use case so that the right data flow is established. Whenever the data flow is to be changed in order to serve a different use case, devices in the network have to be reconfigured and possibly reprogrammed again. Moreover the necessary changes usually require an intervention by a technically qualified person and might require visiting the different locations in order to apply the changes. Adding new use cases that have not been served before usually cannot be done without manual reconfiguration or programming. While in theory the devices in the network might serve significantly different use cases, in practice the reasons mentioned above result in using the equipment mostly for serving a single use case for a longer period of time as quickly switching between use cases by the end user or quickly adding new use cases are practically not feasible.

On the other hand to organize a voting or poll in a collaboration context, a number of solutions are currently available for how to provide the questions and collect the response.

Physical devices, known as "clickers", allow a participant to press a button to indicate his choice. The poll can be selected ad-hoc and can present questions of any type of content.

Current digital solutions are typically limited to specific plug-ins for presentation software that allow for creating voting or poll questions. The results are gathered from the user inputs and presented within the extended presentation tool.

When starting from a conventional poll tool, the teacher typically has to create a question and enter it into the tool and then launching the poll. The presentation of the results is also done within the poll tool. As in the case of the "clickers" mentioned above, some of these tools allow the results to be integrated into the tool's presentation environment.

There exist software solutions that allow users to use their own device to participate, for example, either via sending e.g. SMS messages by a specific web application, or by installing an app on the device.

The current solutions have a number of shortcomings, for example:

To obtain a single experience of arbitrary presentation content together with a poll, a specific or enriched presentation tool has to be used. Alternatively, the content has to be inserted into a poll tool.

In any case, the poll is uniquely set up for each occasion. In some cases the poll can be stored and used at a later occasion, but there is a high risk the content of the poll is no longer suitable for the content of the related presentation material.

Conventional methods require long preparation time and are not suitable for ad-hoc usage.

SUMMARY

It is an object of the present invention to provide systems, methods, devices, software and computer programs for collaborations. For example the collaboration can be distributed over different locations, and for example one location may have a moderator moderating the collaboration session with participants in the one location and other participants in one or more remote locations.

Embodiments described with reference to FIGS. 1 to 5 provide a method for configuring a system on which a method described with reference to FIGS. 6 to 15 can be run. This allows to stream media in parallel with a dialog box (which resides in a web browser).

The configuration described with reference to FIGS. 1 to 5 is dynamic, one can easily add or remove sinks (e.g. displays, speakers) or sources (e.g. camera or microphone) while the session is running. In accordance with embodiments of the present invention allow the network configuration to adapt automatically and send streams where they need to go.

Whenever sources or sinks are added or removed, the active rules will be re-applied and the data streams between sources and sinks will be adjusted where needed. Network devices are selected based on the label they carry. For example this selection can be to those labelled with a selected use-case. An aspect of the present invention is that only the devices belonging to the use-case will get the device labels. This selection means that all network devices will not get the list of device labels otherwise there would be no longer any selection.

Applications described with reference to the embodiments are designed preferably for an education environment where one can use the same resources/hardware for different configurations/use-cases, and where participants/students will join and leave the session, being at the campus facilities or at their homes, and where data is streamed across the network between the devices.

For example the collaboration may include combining a digital interactive dialog window with content shown by web browsers. Streams can be sent to a selection of the collaborative participants only. Embodiments of the present invention have moderator or teacher nodes (e.g. running on a moderator or teacher laptop), display nodes (e.g. "base units" that control a display viewed by a number of participants and participant nodes (e.g. student laptops). In these embodiments the different devices gets roles which different abilities/permissions.

Embodiments of the present invention provide a method for configuring network devices for streaming electronic media data over a computer network that can comprise a web server, a non-volatile memory and at least two type 1 network devices and at least one type 2 network device connected to the web server over the computer network. The method can comprise the steps of:

the web server creating or receiving an electronic list of all network devices connected to said web server, and each network device can have an entry in the electronic list which entry can be stored by the web server in said electronic list in the non-volatile memory.

Configuring use-cases can comprise:
for at least two use-cases, for each use-case
adding an electronic use-case label to entries of at least two type 1 network devices and at least one type 2 network device in the electronic list,
and for each network device having the electronic use-case label, the web server can store in the non-volatile memory for each network device of a first type, a first list of electronic device labels,
and for each network device of a second type, the web server can store a second list of electronic device labels, defining at least one condition wherein for each condition at least one out of a subset of the second list of electronic device labels is present or is not present in the first list of electronic device labels.

Optionally the web server can store a Boolean logic expression comprising at least one Boolean operator out of "AND", "OR", "NOT", and at least one Boolean operand, where for each Boolean operand there is a dedicated item in said second list of electronic device labels.

The step of activating a use-case can comprise:
the web server receiving a notification of a use-case selected by a user via inputs from a web page served by said web server,
and for each network device having the selected electronic use-case label, automatically providing the web server with at least read access to the non-volatile memory.

For each pair of a type 1 network device and a type 2 network device, the web server can read the first and second lists of electronic device labels and the at least one condition if all conditions defined for the active use-case are fulfilled, and the web server can be configured to instruct the network devices for streaming electronic media data from the type 1 network device to the type 2 network device.

Optionally the web server can read the Boolean logic expression,
and for each operand of the Boolean logic expression,
if the dedicated item in the second list of electronic device labels is present in the first list of electronic device labels, the web server can set the operand to TRUE (i.e. one of the values of a pair e.g. alternatively FALSE), otherwise it can set the operand to a Boolean value such as FALSE (or alternatively TRUE, i.e. the other value of a pair).

Optionally, the web server can then evaluate the Boolean logic expression and if it yields a Boolean value such as TRUE (i.e. one of the values of a pair or e.g. alternatively FALSE, i.e. the other value of a pair), it can instruct the network devices for streaming electronic media data from the type 1 network device to the type 2 network device.

Additionally or alternatively, the method can comprise, for a selected use-case, while streaming electronic media data over the computer network, adding a network device to the network.

For the added network device the web server can add an entry in the electronic list of network devices, and the web server can add an electronic use-case label to said entry.

If the added network device is of the first type,
then the web server can store, in the non-volatile memory, a first list of electronic device labels.

If the added network device is of the second type,
then the web server can store, in the non-volatile memory, a second list of electronic device labels defining at least one condition wherein for each condition at least one out of a subset of the second list of electronic device labels is present or is not present in the first list of electronic device labels.

Optionally or alternatively the web server can store a Boolean logic expression. The Boolean expression can comprise at least one Boolean operator out of "AND", "OR", "NOT", and at least one Boolean operand, where for each Boolean operand there is a dedicated item in said second list of electronic device labels.

Then for the added network device having the selected electronic use-case label, the method comprises automatically providing the web server with at least read access to the non-volatile memory, and for each pair of the added network device and a network device of a device type other than the added network device, having the use-case label of the selected use-case, the web server can read the first and second lists of electronic device labels and the at least one condition if all conditions defined for the active use-case are fulfilled. The web server can be configured to instruct the network devices for streaming electronic media data from the type 1 network device to the type 2 network device.

Optionally the web server can read the Boolean logic expression and for each operand of the Boolean logic expression, if the dedicated item in the second list of electronic device labels is present in the first list of electronic device labels, the web server sets the operand to TRUE (i.e. one value of a pair), otherwise it sets the operand to FALSE (i.e. the other value of the pair).

Then, optionally, or alternatively the web server can evaluate the Boolean logic expression and if the Boolean logic expression yields TRUE, (alternatively FALSE i.e. the other value of a pair) the web server can instruct the network devices for streaming electronic media data from the type 1 network device to the type 2 network device.

Additionally or alternatively, the set of electronic device labels of the network device can depend on the credentials or certificates used for connecting the network device to the web server.

Additionally or alternatively, the method can comprise instructing at least one type 2 network device that is receiving at least one electronic media data stream to start rendering the at least one electronic media data stream.

Additionally or alternatively, the method can comprise instructing at least one type 2 network device that is receiving at least one electronic media data stream, to not render at least one of the at least one received electronic media data stream.

Additionally or alternatively, the method can comprise instructing at least one type 2 network device that is receiving at least one electronic media data stream to start rendering the at least one electronic media data stream in accordance with a set of rules. Rendering the content can be done in accordance with a set of rules, e.g. in case of video content the rule can be to respect the aspect ratio of the content and/or arrange the content in a non-overlapping layout, e.g. in case of audio content the rule can be mix the audio signals so that the volume of the audio signals is equal, etc.

Additionally or alternatively, content rendered by each of the type 2 devices having the selected electronic use-case label is preferably received directly from the type 1 device that renders the electronic media data containing said content without any intermediate type 1 or type 2 network device processing said content. For all content that is rendered by the sinks, there is preferably no intermediate type 1 and/or type 2 network devices in between the source that generates the content and the sink that renders the content. In other words, putting things like a network compositor (=a sink that receives several streams, makes a composition and a source that streams out this composition) or a transcoder between the source and the sink is preferably not allowed.

Additionally or alternatively, the step of activating a use-case can comprise the notification having a use-case selected by a user and at least one device label,
and executing the step of activating the selected use-case for all network devices having the use-case label and at least one of the at least one device label.

Additionally or alternatively, the method can comprise while a first use-case is active, the web server receiving a notification comprising a second use-case selected by a user and at least one second device label being different from any of the at least one device label of the first use-case,
and executing the step of activating the selected second use-case for all network devices having the second use-case label and at least one of the at least one second device label.

Additionally or alternatively, the step of activating a use-case can comprise the notification having at least one first device label and at least one second device label and at least one third device label,
and executing the step of activating the selected use-case can comprise adding the at least one third device label to the device label list of all network devices having the use-case label and at least one of the at least one first device label and at least one of the at least one second device label.

In another embodiment of the present invention there is provided a system for exchanging electronic media data over a computer network that can comprise:
a web server, a non-volatile memory and at least two type 1 network devices and at least one type 2 network device connected to the web server over the computer network,
an electronic list of all network devices connected to said web server. Each network device can have an entry in the electronic list, the web server being configured to store the entry in said list in the non-volatile memory.

Then for at least two use-cases, for each use-case the entries of at least two type 1 network device and at least one type 2 network device in the electronic list can have an electronic use-case label.

For each network device having the electronic use-case label, the non-volatile memory can store:
for each network device of a first type, a first list of electronic device labels,
and for each network device of a second type, a second list of electronic device labels, defining at least one condition wherein for each condition at least one out of a subset of the second list of electronic device labels is present or is not present in the first list of electronic device labels, Optionally or alternatively, also a Boolean logic expression can be included comprising at least one Boolean operator out of "AND", "OR", "NOT", and at least one Boolean operand, and wherein for each Boolean operand there is a dedicated item in said second list of electronic device labels.

Additionally or alternatively the system can comprise the web server being configured to be deployed in the cloud or on-premises.

Additionally or alternatively the system can comprise means for activating a use-case which comprises the web server being configured to receive a notification of a use-case selected by a user via inputs from a web page served by said web server.

For each network device having the selected electronic use-case label, the web server can be configured to automatically receive at least read access to the non-volatile memory. And for each pair of a type 1 network device and a type 2 network device, the web server can be configured to read the first and second lists of electronic device labels and the at least one condition if all conditions defined for the active use-case is fulfilled, and the web server is configured to instruct the network devices for streaming electronic media data from the type 1 network device to the type 2 network device.

Optionally or alternatively the web server can read the Boolean logic expression and for each operand of the Boolean logic expression, if the dedicated item in the second list of electronic device labels is present in the first list of electronic device labels, the web server can be configured to set the operand to TRUE (a value of a pair such as alternatively FALSE), otherwise it sets the operand to FALSE (i.e. the other value of the pair alternatively TRUE).

Optionally or alternatively, web server can be configured to evaluate the Boolean logic expression and if the Boolean logic expression yields TRUE (i.e. the one value of the pair alternatively it can be FALSE) the web server is configured to instruct the network devices for streaming electronic media data from the type 1 network device to the type 2 network device.

Additionally or alternatively the system can comprise, for a selected use-case, while streaming electronic media data over the computer network, means for adding a network device to the network,
and for the added network device the web server can be configured to store in the non-volatile memory, a first list of electronic device labels.

If the added network device is of the second type,
the web server can be configured to store in the non-volatile memory, a second list of electronic device labels defining at least one condition wherein for each condition at least one out of a subset of the second list of electronic device labels is present or is not present in the first list of electronic device labels.

Optionally the web server can store a Boolean logic expression comprising at least one Boolean operator out of "AND", "OR", "NOT", and at least one Boolean operand. And wherein for each Boolean operand where there is a dedicated item in said second list of electronic device labels, for the added network device having the selected electronic use-case label, the web server can be configured to automatically obtain at least read access to the non-volatile memory.

For each pair of the added network devices and a network device of a device type other than the added network device, having the use-case label of the selected use-case, the web server can be configured to read the first and second lists of electronic device labels and the at least one condition if all conditions defined for the active use-case is fulfilled, whereby the web server can be configured to instruct the network devices for streaming electronic media data from the type 1 network device to the type 2 network device.

Optionally or alternatively the webserver can be configured to read the Boolean logic expression and for each operand of the Boolean logic expression, if the dedicated item in the second list of electronic device labels is present in the first list of electronic device labels, the web server can be configured to set the operand to a Boolean value such as TRUE, otherwise it sets the operand to FALSE (or vice versa).

Optionally or alternatively the web server being configured to evaluate the Boolean logic expression and if the Boolean logic expression yields a Boolean value such as TRUE (or alternatively FALSE) the web server can be configured to instruct the network devices for streaming electronic media data from the type 1 network device to the type 2 network device.

Additionally or alternatively the system can comprise that the set of electronic device labels of the network device can depend on the credentials or certificates used for connecting the network device to the web server.

Additionally or alternatively, the system can comprise that at least one type 2 network device can receive at least one electronic media data stream being configured to receive an instruction to start rendering the at least one electronic media data stream.

Additionally or alternatively the system can be configured so that any content rendered by each of the type 2 devices having the selected electronic use-case label is received directly from the type 1 device that renders the electronic media data containing said content without any intermediate type 1 or type 2 network device processing said content. For all content that is rendered by the sinks, there is preferably no intermediate type 1 and/or type 2 network devices in between the source that generates the content and the sink that renders the content. Putting things like a network compositor (=a sink that receives several streams, makes a composition and a source that streams out this composition) or a transcoder between the source and the sink is preferably not allowed.

Additionally or alternatively the system can comprise that at least one type 2 network device that is receiving at least one electronic media data stream, can be configured to receive an instruction to not render at least one of the at least one received electronic media data stream.

Additionally or alternatively, the system can configured so that at least one type 2 network device that is receiving at least one electronic media data stream is instructed to start rendering the at least one electronic media data stream in accordance with a set of rules. The at least one type 2 network device can be configured to rendering the content in accordance with a set of rules, e.g. in case of video content the rule can be to respect the aspect ratio of the content and/or arrange the content in a non-overlapping layout, e.g. in case of audio content the rule can be mix the audio signals so that the volume of the audio signals is equal, etc.

Additionally or alternatively the system can comprise that the means for activating a use-case can comprise the notification having a use-case selected by a user and at least one device label, and can be configured to execute activating of the selected use-case for all network devices having the use-case label and at least one of the at least one device label.

Additionally or alternatively the system can comprise that while a first use-case is active, the web server can be configured to receive a notification comprising a second use-case selected by a user and at least one second device label being different from any of the at least one device label of the first use-case.
The web server can also be configured to execute activating of the selected second use-case for all network devices having the second use-case label and at least one of the at least one second device label.

Additionally or alternatively the system can comprise that the means for activating a use-case can comprise the notification having at least one first device label and at least one second device label and at least one third device label, and can be configured to execute activating of the selected use-case by adding the at least one third device label to the device label list of all network devices having the use-case label, and at least one of the at least one first device label and at least one of the at least one second device label.

In another embodiment of the present invention there is provided a computer program product which when executed on a processing engine can perform a method according to any of the above mentioned methods.

In another embodiment of the present invention there is provided a non-transitory signal storage device storing the computer program product of the above computer program product.

In further independent aspect the present invention provides a first subsystem having a network and first display device. A first display can have a first web browser receiving first content from a back end accessed by a first set of credentials.

A second subsystem, which preferably works with and is in communication with or connected to the first subsystem via a network, includes at least one secondary display which can have a second web browser receiving second content from the back end. The second display can be accessed by a second set of credentials. The first credentials can be associated with a selection menu and the second credentials can be associated with a set of digital interactive dialog windows. The method can comprise the steps of instructing the back end to have the second content displayed on a second web browser on the at least one secondary display. And while the second content is displayed, the selection menu can be used to select a digital interactive dialog window type, and to launch a corresponding digital interactive dialog window, which can be unmodified onto the second web browser of the at least one secondary display. This can be performed so that the digital interactive dialog window is juxtaposed with, combined with or overlaid onto the second web browser content on the secondary display.

This has the advantage that a user having the first type or set of credentials can quickly launch a digital interactive dialog window to the users having the second type or set of credentials and collect their feedback. The digital interactive dialog window allows the users to vote or provide comments in an interactive manner. The digital interactive dialog can be launched very quickly so that the attention of the users having the second type of credentials is not lost. The launch according to embodiments of the present invention can be in less than 5 seconds such as in 2 seconds plus or minus 1 second. It can be launched at any moment (ad-hoc) during the presentation, independent of the content being presented. There can be several types of digital interactive dialog windows to choose from and they are launched as-is. They can be configured in advance so that they do not need to be further prepared or set up, hence speeding up the launching of the digital interactive dialog.

Other forms of feedback can be provided in any of the embodiments of the present invention by a transducer that can transform human characteristics into an electrical signal. For example such a transducer can be a biometric sensor. The human characteristics can comprise features such as fingerprints or palm-prints, the iris or retina, the face, DNA, scent, voice, walking style or typing rhythm. A sensor in the transducer can measure physical properties of the human appearance and transform it into an electrical signal. The physical property can be e.g. brightness, light frequency, temperature, speed, electrical capacity, sound frequency, or rhythm of performing an action like walking or typing.

In one embodiment, biometric sensors can be used for collecting biometric data from a participant. The biometric data can be used to provide feedback to the moderator on the activity level of the participant. This may be especially useful when there are remote participants in the session so that the teacher can obtain information on the activity of the remote participants and hereby conclude whether they seem to follow the session. Additionally the electrical signals from the biometric sensor can be binned into levels of the physical property being measured. This could be used to give the moderator an alert for certain activity levels, for example if the activity is low. The biometric sensor can have processing power, a memory such as a LUT with entries grouped into levels of the electrical signal, each level being registered with a value. The biometric sensor can measure the physical property of the human characteristics and transform the measured signal into an electrical signal, finding the level of the electrical signal in the LUT and extracting the corresponding value.

Additionally or alternatively, while launching the digital interactive dialog window, the second web browser content on at least one of the secondary displays can cover its full display area. This reduces the possibility that users lose focus by using other windows visible on the display. This also has the advantage of not having to re-scale or alter the content already presented when launching the digital interactive dialog window. Even if the web browser is running in "kiosk mode" (i.e. the content fills the full display, and the browsers title bar, menus, toolbars, status bars, etc., are not displayed), the interactive dialog window can still be launched. The launch can be in less than 5 seconds such as in 2 seconds plus or minus 1 second.

Additionally or alternatively the method can comprise the digital interactive dialog window overlapping the second web browser content on each of the at least one secondary display with 1 to 100 percent.

This has the advantage of having the freedom to choose the location on the display where the interactive dialog window is positioned, independent on the size or location of the already displayed web browser content.

Additionally or alternatively the digital interactive dialog window can be displayed in semi-modal or modal mode. With a semi-modal or modal mode, the user with the first set of credentials (e.g. a meeting moderator or a teacher) had the possibility to limit which actions the user with the second set or type of credentials (e.g. a meeting participant or a student) can take, e.g. anything more than just provide his/her input to the interactive dialog. A modal dialog can lock all other activity but the dialog. A semi-modal dialog can permit the participant/student/etc. to perform some limited amount of actions, e.g. posing a question to the moderator/teacher/etc.

Additionally or alternatively, some embodiments may include various types of audio signals. The audio can be streamed between display devices. For example, the audio stream can be rendered by a second web browser on a secondary display.

This has the advantage of allowing web content comprising audio, as well as interaction between BYOD's at different physical locations in the network.

Additionally or alternatively, a message associated with the digital interactive dialog window (e.g. a question or an instruction to provide feedback) can be delivered to the secondary display using the second web browser content, and/or by using audio and/or video streaming between display devices, or even by using human speech. For example, the interactive window can allow feedback from a transducer that can transform human characteristics into an electrical signal can be referred to as a biometric sensor. The human characteristics can comprise features such as fingerprints or palm-prints, the iris or retina, the face, DNA, scent, voice, walking style or typing rhythm. A sensor in the transducer can measure physical properties of the human appearance and transform it into an electrical signal. The physical property can be e.g. brightness, light frequency, temperature, speed, electrical capacity, sound frequency, or rhythm of performing an action like walking or typing.

In one embodiment, biometric sensors can be used for collecting biometric data from a participant. The biometric data can be used to provide feedback to the moderator on the activity level of the participant. This may be especially useful when there are remote participants in the session so that the teacher can obtain information on the activity of the remote participants and hereby conclude whether they seem to follow the session. Additionally the electrical signals from the biometric sensor can be binned into levels of the physical property being measured. This could be used to give the moderator an alert for certain activity levels, for example if the activity is low. The biometric sensor can have processing power, a memory such as a LUT with entries grouped into levels of the electrical signal, each level being registered with a value. The biometric sensor can measure the physical property of the human characteristics and transform the measured signal into an electrical signal, finding the level of the electrical signal in the LUT and extracting the corresponding value.

Embodiments of the present invention have the advantage that the interactive dialog window only needs to comprise the different response alternatives, which can therefore be formulated independent from the question/instruction/task/ etc. The term "unmodified" refers to there being no requirement to customise the digital interactive dialog window for the actual questions posed. In this way a set of standard responses can be re-used and they can be preceded by any question/instruction/task/etc. with no need of preparation or modification of the standard responses.

Additionally or alternatively there is provided a system for creating arrangements of a digital interactive dialog window and a first and second web browser content. The system can comprise a first and a secondary display device being associated with different credentials and displaying a first and second web browser, respectively. The first display device can be associated with a selection menu comprising a set of digital interactive dialog window types, so that, when a digital interactive dialog window type is selected, the secondary display device can comprise an arrangement of the corresponding unmodified digital interactive dialog window juxtaposed with, combined with or overlaid onto the second web browser content. The digital interactive dialog window can overlap the second web browser content with 1 to 100 percent.

This has the advantage that both the web browser content and the interactive dialog window can have any size and position on the display independently of each other. Additionally or alternatively the web browser content may fully cover the display area.

This has the advantage that if the web browser is running in "kiosk mode" (i.e. the content fills the full display, and the browsers title bar, menus, toolbars, status bars, etc., are not displayed), the interactive dialog window can be positioned anywhere on top of the web browser content.

Additionally or alternatively the back end is deployed in the cloud or on-premises. The back end can comprise a database for web content, results, user information, statistics, etc.

Additionally or alternatively the digital interactive dialog window can be any of a poll, a chat, voting buttons, voting sliders, text input fields, or a combination thereof.

In accordance with another aspect of the present invention a method is provide for combining a digital interactive dialog window with content shown by web browsers, which is for use with a network. The network can be located at any geographical place which has network access. For example, the network preferably comprises a first display displaying a first web browser and being configured to receive first content from a back end accessed by a first set of credentials, the first credentials being associated with a selection menu for digital interactive dialog window types.

In accordance with this aspect the method can comprise displaying a second web browser on at least one secondary display, the second web browser being configured to receive second content from the back end accessed by a second set of credentials, the second credentials being associated with a set of one or more digital interactive dialog windows, having the second content displayed on the second web browser on the at least one secondary display, and while the second content is being displayed, a digital interactive dialog window type is launched as a corresponding unmodified digital interactive dialog window onto the second web browser of the at least one secondary display, so that the digital interactive dialog window is combined with, juxtaposed with or overlaid onto the second web browser content on the at least one secondary display. This launch can be in less than 5 seconds such as in 2 seconds plus or minus 1 second.

The at least one secondary display can have a full display area, and the method can comprise while launching the digital interactive dialog window, the second web browser content displayed on the at least one secondary display covering the full display area.

While launching the digital interactive dialog window, the digital interactive dialog window can overlap the second web browser content on the at least one secondary display with 1 to 100 percent.

The digital interactive dialog window can be displayed as semi-modal or modal. This has the advantage that the user of the secondary device must treat the interactive dialog window before continuing.

Audio can be streamed to the at least one second display. For example, the second web browser on the at least one secondary display can render the streaming audio.

A message can be received which can be associated with the digital interactive dialog window using audio and/or video streaming. Or a message can be received associated with the digital interactive dialog window, in the second web content.

The digital interactive dialog window can be launched while receiving a message associated with the digital interactive dialog by human speech to a user of a secondary display. The launch can be in less than 5 seconds such as in 2 seconds plus or minus 1 second.

Embodiments of the present invention which are configured to create arrangements of a digital interactive dialog window on a secondary display device can be used with a network having a first display device being associated with first credentials and displaying a first web browser content on a first web browser, the first display device being associated with a selection menu comprising a set of digital interactive dialog window types.

In that case the system comprise a secondary display device displaying a second web content on a second web browser, and for a selected digital interactive dialog window type, the secondary display device being configured to display an arrangement of an unmodified digital interactive dialog window corresponding to the selected digital interactive dialog window type combined with, juxtaposed with or overlaid onto the second web browser content.

For each arrangement, the digital interactive dialog window can overlap the second web browser content with 1 to 100 percent.

The secondary display device typically has a display area and for each arrangement, the second web browser content can fully cover the display area.

For each arrangement, the back end can be deployed in the cloud or on-premises.

For each arrangement, the back end can comprise a database optionally for content, results, user information, statistics.

For each arrangement, the interactive dialog window can be any of a poll, a chat, voting buttons, voting sliders, text input fields.

The present application also provides software and/or computer programs for implementing any of the methods of the present invention. Such software or computer programs can be stored on non-transitory digital signal storage means.

An advantage of embodiments of the present invention is the shortening of the time spent in the interactive window, i.e. the duration the operator stays in this set-up window. Shortening time relates to alterations in how the system works.

The flow of the lesson is maintained from a technical point of view, i.e. the flow is linked to the flow and presentation of technical data which is altered by and/or which alters the way the system operates. Thus embodiments of the present invention can increase the number of exchanged data streams within a period of time thus providing an increase of efficiency. The processing/thinking time per participant can be kept he same despite this increase.

The teacher or moderator can provide information to the students in two main routes, e.g. an Interactive window or by other means: streaming audio and/or video and merely speaking.

The skilled person may see an Interactive window as the slowest way of bringing the information to the students, because it interrupts the presentation flow. Despite this, the time spent can be decreased, as achieved by embodiments of the present invention:

Conventionally it has been known to arrange both the Choices and the Alternatives in the correspondence to the Interactive window. The relevant content to be transmitted is: Question, Choice headline and Choice content, thus the teacher or moderator can move the choice content into other means. These other means can be e.g. streaming, or speaking. The choice headlines can be kept in the Interactive window. In this way the time is decreased that the teacher or moderator needs to spend in the Interactive window. An additional benefit is the re-use of the choices headlines, e.g. for a later event such as for a later quiz. A further e benefit is the separating of the Choice headlines and the choice content.

Any of the embodiments of the present invention may include sending user specific results and statistics in the context of results and statistics for all participants to at least one user.

Any of the embodiments of the present invention may include a biometric sensor having processing power, a memory such as a LUT grouped into levels of the electrical signal, each level being registered with a value, the method comprising the steps of the biometric sensor measuring the physical property of the human characteristics and transforming the measured signal into an electrical signal, finding the level of the electrical signal in the LUT and extracting the corresponding value.

An advantage of the technical details of embodiments of the present invention is a quick launch of a digital interactive dialogue window allows continuous presence of the participants in any event.

In another aspect a method for combining a digital interactive dialog window with content shown by web browsers is provided, which is for use with a network having a first network device having a first device label displaying a first web browser and being configured to receive first content from a back end accessed by a first set of credentials, the first credentials being associated with a selection menu for digital interactive dialog window types, the first network device having a first device label being configured to select a digital interactive dialog window type from a selection menu and communicating the digital interactive dialog window type to the network, the method comprising displaying a second web browser on at least one secondary network device having a second device label which is in communication or connected to the network, the second web browser being configured to receive second content from the back end accessed by a second set of credentials, the second credentials being associated with a set of one or more digital interactive dialog windows, having the second content displayed on the second web browser on the at least one secondary network device having a second device label and while the second content is being displayed, a digital interactive dialog window type is launched as a corresponding unmodified digital interactive dialog window onto the second web browser of the at least one secondary network device having a second device label, so that the digital interactive dialog window is combined with, juxtaposed with or overlaid onto the second web browser content on the at least one secondary network device having a second device label.

In yet another aspect a system for creating arrangements of a digital interactive dialog window is described for use with a network having a first network device having a first device label being associated with first credentials and displaying a first web browser content on a first web browser, the first network device having a first device label being associated with a selection menu comprising a set of digital interactive dialog window types, the system comprising:

a second network device having a second device label displaying a second web content on a second web browser, the second network device having a second device label being in communication with or connected to the network and for a selected digital interactive dialog window type, the second network device having a second device label being configured to display an arrangement of an unmodified digital interactive dialog window corresponding to the selected digital interactive dialog window type combined with, juxtaposed with or overlaid onto the second web browser content.

For any of the embodiments of the present invention a computer program product can be provided which when executed on a processing engine performs a method according to any of the methods of the present invention. Optionally a non-transitory signal storage device stores the computer program product.

DEFINITIONS

Figure 1:
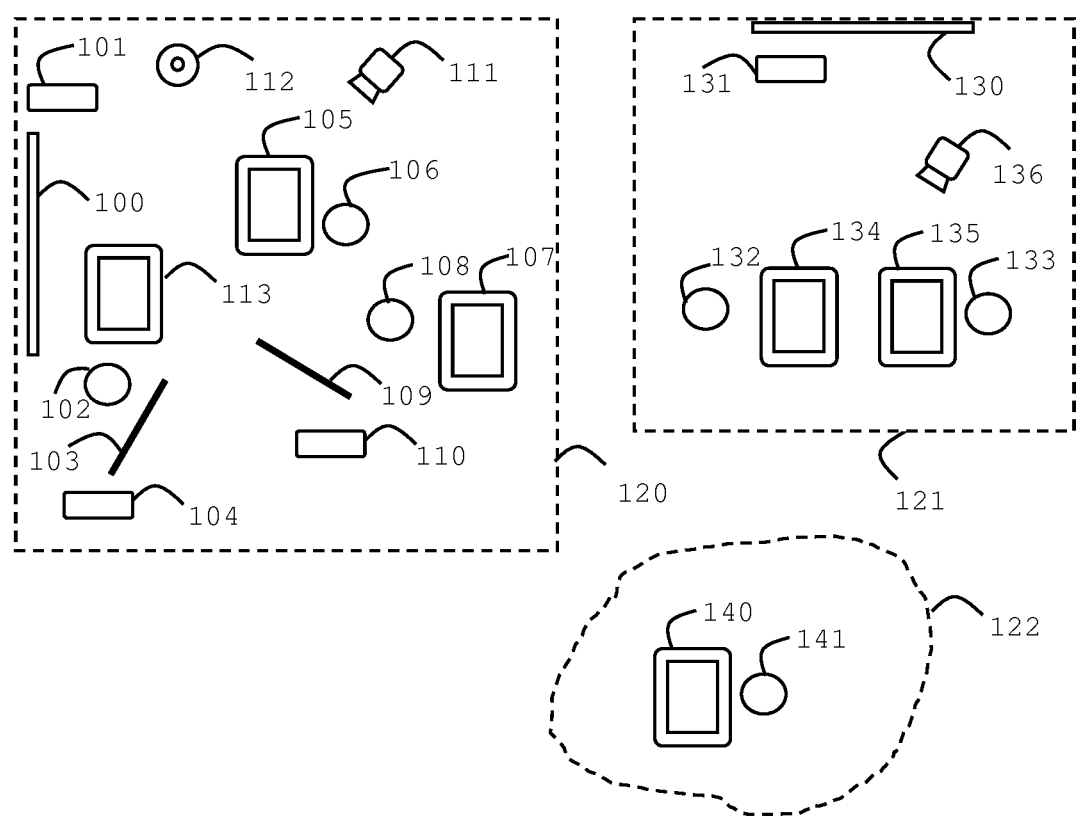
FIG. 1 shows an embodiment of the present invention comprising BYOD's and network devices distributed over several physical locations.

A "network device" can be an electronic device having computing power and network abilities, it can be connected to a display and can manage what is shown on the display. Hence a "network device" can relate to a network enabled digital processing device having some form of output medium such as a display screen (video), speakers (audio), disk (recorder), etc. or input medium such as a camera (video), a microphone (audio), a mouse (mouse events), disk (player), etc. These output and or input media can be built-in into the device or be external and connected to the device. Alternatively a network device might receive data from the network and send it out after doing some form of processing on it, on the same or a different network. This is typically the case for transcoders that convert one media stream into another. A network device has a processing engine, i.e. digital processor such as an FPGA (or a microprocessor, having e.g. a Central Processing Unit (CPU) and/or a Graphical Processing Unit (GPU) and memory as well as interfaces such as a serial port or a network interface. A network device in operation is connected to a network, can access this network and use the facilities of the network as well as having local capabilities, applications, functions etc. Note that a BYOD can be a network device, however not all network devices can be considered to be BYODs.

A "non-volatile memory" is a type of memory that retains its information also after that the power has been removed.

"Electronic media data" can be (digital) data, ones and zeros, representing electronic media content, such as for example images, video streams, audio streams, html code, etc.

A "source" can be any device in the network that can render a stream of data, e.g. a video stream, audio stream, a combined video-audio stream, a stream of keyboard events, an html page, . . . .

In the text, a source can be referred to as a "type 1 network device". A source can have a "source role" that qualifies the function of the source in a use case. A source role For example a camera source can have a source role "document camera" denoting that the function of this source in the use case is to film paper documents so that the resulting video can be distributed to one or more destinations. A source role can be stored as an "electronic device label".

Apart from a source role, a source may have one or more static labels and/or session specific labels. Static labels e.g. allow grouping sources together, for example all sources that are physically located in "room A" can have a static label "room A". Session specific labels are assigned whenever a use case in which the source is participating starts. For example if a use case "Overflow lecture" is started and "room A" is denoted as being the master room from which the presenter will do a presentation, all sources that are physically located in "room A" can receive a session specific label "master room" associated with them.

A "sink" or destination can be a network device in the network that can receive at least one stream from a source in the network and render the received stream(s) into a form suitable for an end-user (e.g. show video on a display, output audio through speakers, visualize a stream of mouse events using a cursor on a display, . . . ). Alternatively or additionally it can store or forward the received content, potentially after processing it. In the text, a sink can be referred to as a "type 2 network device".

A "sink role" indicates the function of the sink in a use case. For example a display sink can have a sink role "confidence monitor of master screen" denoting that it will show a copy of the content that is rendered by a display sink that has sink role "master screen". In a similar way as for a source, a sink may have one or more static labels and/or session specific labels. Static and/or session specific labels serve the same purpose as explained above for sources.

A sink role can be stored as an "electronic device label". Also, a "static label" or a "session specific label" can each be stored as an "electronic device label".

A "filter" can be a computer program that selects certain items out of a given set of items. Only items fulfilling certain criteria are retained in the resulting set of items. Criteria usually comprise but are not limited to source and sink roles, static labels, session specific labels and credentials associated with the sources and sinks.

A filter can be represented by a Boolean expression together with an electronic device label list.

The Boolean expression can comprise Boolean operators AND, OR or NOT can be interpreted according to the following
false AND false←result=false
false AND true←result=false
true AND false←result=false
true AND true←result=true
false OR false←result=false
false OR true←result=true
true OR false←result=true
true OR true←result=true
NOT false←result=true
NOT true←result=false
A Boolean operand can be TRUE or FALSE.

A "rule" can be a function that governs the data rendering. A rule is always associated to a sink role and can comprise a filter but is more general than a filter, it also comprises a "rendering part". For example, a rendering part can instruct the sink to which the rule applies on how to render the set of items resulting after applying a filter. For example in case of a display sink the rendering part can instruct what type of layout to be used when rendering multiple streams. A rendering part might also instruct a selected source on for example the data format or encoding scheme to be used for streaming.

A "use-case" can be a collection of possible scenarios or sequences of interactions between elements in a network related to a particular goal. As a minimum, a use case comprises a set of source roles and sink roles and rules associated to the sink roles. A use case can be activated on all sources and sinks in the network or on a selected set of sources and sinks in the network (e.g. all sources and sinks that have a certain static label). Note that multiple use cases can be active simultaneously in a network on distinct sets of sources and sinks.

A "BYOD" (Bring Your Own Device) is any computation device for personal use and can comprise laptops, mobile phones, smartphones, tablets, palm pads and the like, hence it is a processing device. In the present context it can also include a stationary computer. The computation device has means for providing content that can be outputted on an internal or external display device. For example, BYOD can have multiple sinks such as a display, speakers, a disk as well as multiple sources such as a camera, a microphone, a disk. The sinks can be built-in into the BYOD or be external and connected to the device.

A "network" can be a Local Area Network (LAN), e.g. a company network, or a Virtual Private Network within a LAN or any network that has a limited extent and a defined number of users who can access it. It will typically have shared resources.

It can also be a "global network" for example the public internet that extends across the globe and is accessible for anyone. It can also be a private leased line on a network that can span over large distances.

A "web server" can be machine or component, comprising software, that can provide access to information accessible from a computer connected to the Internet or an intranet, it can for example receive web page requests and return web pages in response to the requests.

"The cloud" is a metaphor for the Internet. Cloud computing is usually Internet-based computing. It is a style of computing in which IT-related capabilities are provided "as a service", allowing users to access technology-enabled services from the Internet ("in the cloud") without knowledge of, or control over the technologies behind these servers.

A "service application" can be a function provided by a server. The service application can be deployed as a local service ("on-premise") or as a "cloud service", or it can be distributed among the network devices, or any combination thereof.

A "cloud service" can be any service provided to users on demand via the internet from a cloud computing provider's servers.

A "back end" can be a process or combination of processes that can run on web server hardware, e.g. in the cloud such as in a data center, that serve html pages, execute business logic including acting upon requests from the browsers and handles database storage. The back end usually consists of three parts: a server, an application (e.g. the service application mentioned above), and a database.

A "user credential" can be any user identification data, e.g. a user name together with a matching password or a certificate, used to connect to a service application. Sources and sinks registered to the service application by a client or an agent, can be associated with the user credentials used by the client or agent to connect to the service application.

A "digital interactive dialog window" can be a digital image comprising different fields representing different choices. The digital interactive dialog window can be displayed on an electronic display device, and an operator of the device can make a selection by marking a field in the window with an appropriate tool for the electronic device. From a collection of several digital interactive dialog window types, the moderator can choose a specific one from a "selection menu". Digital interactive dialog window types can be digital interactive dialog window templates.

A "web browser" or "web browser application" is a software application for retrieving, presenting and traversing information resources on the world wide web or a network (e.g. "Google Chrome", "Internet Explorer", "Microsoft Edge", "Firefox", "Safari", . . . . )

A multiple of web browsers can be connected in a collaborative session.

"web application": is the html content that is served to the web browser and that includes JavaScript code, results in an application for the end user when it is interpreted by the web browser. This application will be called the web application. It provides a user experience to the end user that in a preferred embodiment is similar to that of a desktop application.

DETAILED DESCRIPTION

The present invention will be described with respect to particular embodiments and with reference to certain drawings but the invention is not limited thereto but only by the claims. The drawings described are only schematic and are non-limiting.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B. Similarly, it is to be noticed that the term "coupled", also used in the description or claims, should not be interpreted as being restricted to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means.

References to software can encompass any type of programs in any language executable directly or indirectly by a processor. References to logic, hardware, processor or circuitry can encompass any kind of logic or analog circuitry, integrated to any degree, and not limited to general purpose processors, digital signal processors, ASICs, FPGAs, discrete components or transistor logic gates and so on.

The embodiments described below can be linked by a system that is used to provide digital communication, i.e. as described for FIGS. 1 and 9 and FIGS. 5 and 10, respectively. Each of the embodiments provides methods and systems of collaboration as parallel embodiments. All the embodiments show an improvement in efficiency.

FIG. 1 shows an embodiment of the present invention comprising a system for collaboration being distributed over different locations. There can be a main location 120, an overflow location 121 within the same campus as 120, and a remote site 122. In the main location 120 there is a moderator 102 moderating the collaboration session use case using a BYOD 113, a main screen 100, driven by network device 101, a self-view screen 103 driven by a network device 104. A self-view screen can be used to show the moderator what the participants in the remote locations see. In the main room 120 there are also two participants 106 and 108. Participant 106 operates a BYOD 105 and participant 108 operates a BYOD 107. There is also a far-view display 109 driven by a network device 110. A far-view display can be used if the location is very big and the participants are located far from the main screen. The location 120 is also equipped with a camera 111 and a microphone 112.

Location 121 can for example be an "overflow room" that can be used to house further participants when the main location 120 would be fully occupied. The room 121 can have a main screen 130, driven by a network device 131. In this example the room 121 has two participants 132 and 133, who are operating BYOD's 134 and 135 respectively. The room is also equipped with a camera 136.

Locations 120 and 121 can be located within the same campus (for example a university campus), and location 122 can be located outside this campus (for example the home of a student). The user 141 in the off-site location 122 can participate via the BYOD 140.

All devices in the collaboration system can report to a web server that can be on premise or in the cloud. The collaboration system can be managed by a service application, or web application, located on the server or distributed among the network devices.

Figure 2:
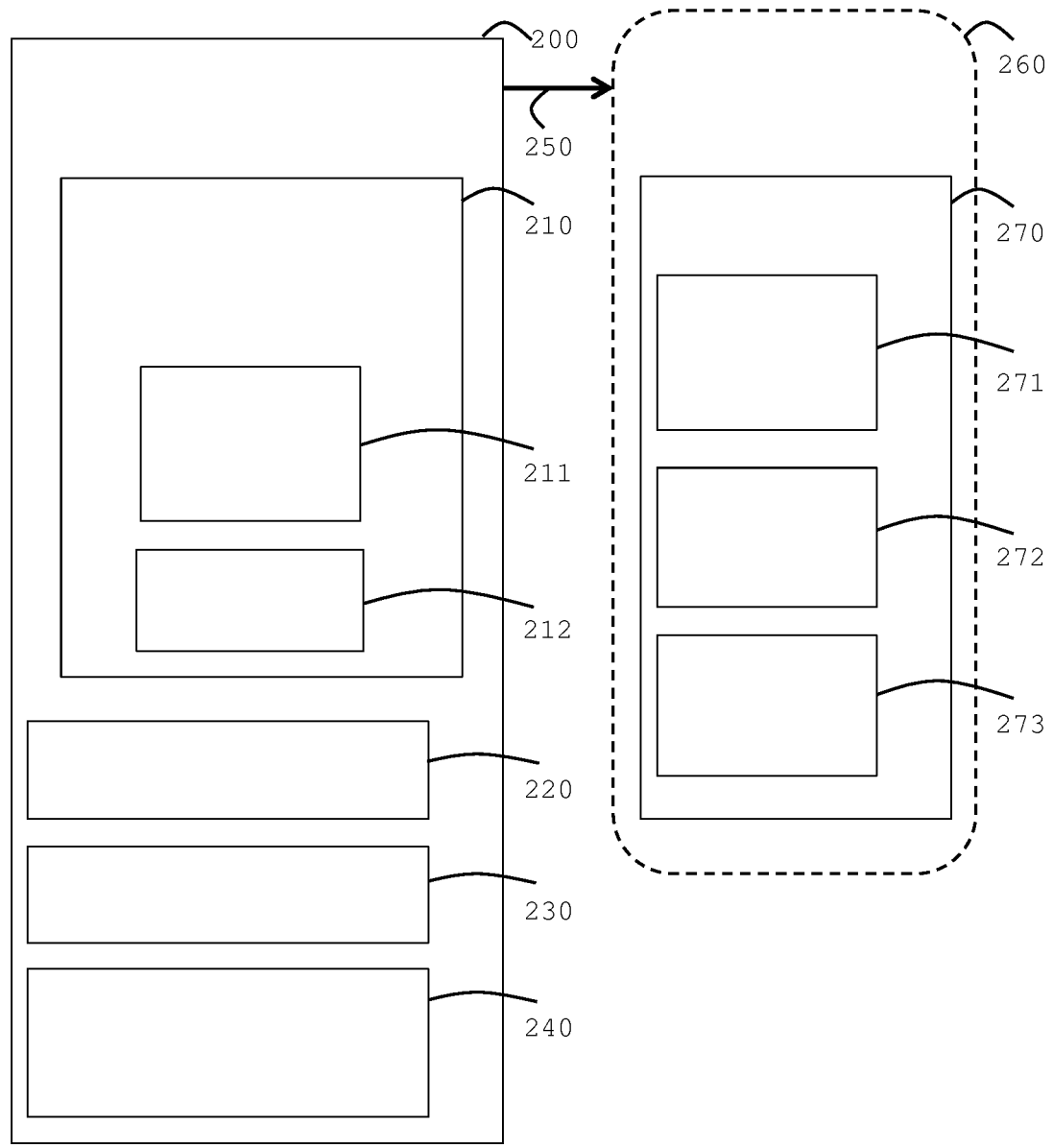
FIG. 2 shows the relationships and multiplicity of the elements used by a use case as used in the present invention.

FIG. 2 shows an embodiment of the present invention comprising the items involved in a use case definition and its application onto a set of sources and sinks. Each use case definition 200 (of [2 . . . n] use case definitions) involves at least one source role definition 230 (of [1 . . . n] source role definitions) and at least one sink role definition 220 (of [1 . . . n] sink role definitions). Such role definition denotes the function of the source or sink as part of the use case. For each sink role definition 220 a corresponding rule 210 needs to be defined. There can be [1 . . . n] rules. A rule consist of a filter 211 and an optional rendering part 212. The filter 211 is mandatory and serves for selecting the data streams to be rendered by the sink. There is exactly one filter (which can be made up out of a combination of sub-filters). So out of the set of sources to which the filter is applied, the sources retained by the filter 211 are to be rendered by the sink with sink role corresponding to the rule that comprises the filter. Next to the filter a rule can also contain a rendering part 212 (of [0 . . . 1] rendering parts). The rendering part 212 can give info to the sink on how the data streams selected by the filter 211 are to be rendered by the sink with sink role corresponding to the rule that comprises the rendering part.

It can also be used to give info to a selected source on how it should render the data stream. So there are as many rules 210 as there are sink roles definitions 220. There can be of [1 . . . n] sink role definitions. Note that some of the defined sink roles 220 and the corresponding rules 210 might be re-usable over multiple use cases. Optionally a use case can also comprise session specific label definitions 240. There can be [0 . . . n] session specific label definitions. These session specific label definitions 240 allow influencing the behaviour of a use case when it is launched. Whenever a use case has been activated on a set of sources and sinks 260, the sources and sinks 270 each have exactly one role 271 that has been assigned at the moment the use case was activated. As mentioned, in the case of a sink, the assigned sink role has a corresponding rule. Sources and sinks 270 also can have optional static labels 272 assigned to them. There can be [0 . . . n] static labels. These static labels 272 do not change when the use case changes. The can be used for example to group sources and/or sinks together. For example all sources and sinks that are physically located in a room called "Room A" can have a static label "Room A". Optionally there can also be [0 . . . n] session specific labels 273, as defined by the session specific label definition 240 of the use case definition 200 of the applied use case. The session specific labels 273 exist only during the lifetime of the applied use case session. They allow to set certain parameters, for example in an overflow lecture use case session, out of all rooms that participate in the session it must be clear which room will serve as main room from which the presenter will present. So this information can be passed along when the use case session is started. In the mentioned example the session specific labels 273 can make clear which sources and sinks 270 belong to the main room of the overflow lecture use case. When applying a different use case on the same selection of sources and sinks, the corresponding roles 271 and session specific labels 273 will be applied on sources and sinks 270, replacing the ones from the previous use case session.

Figure 3:
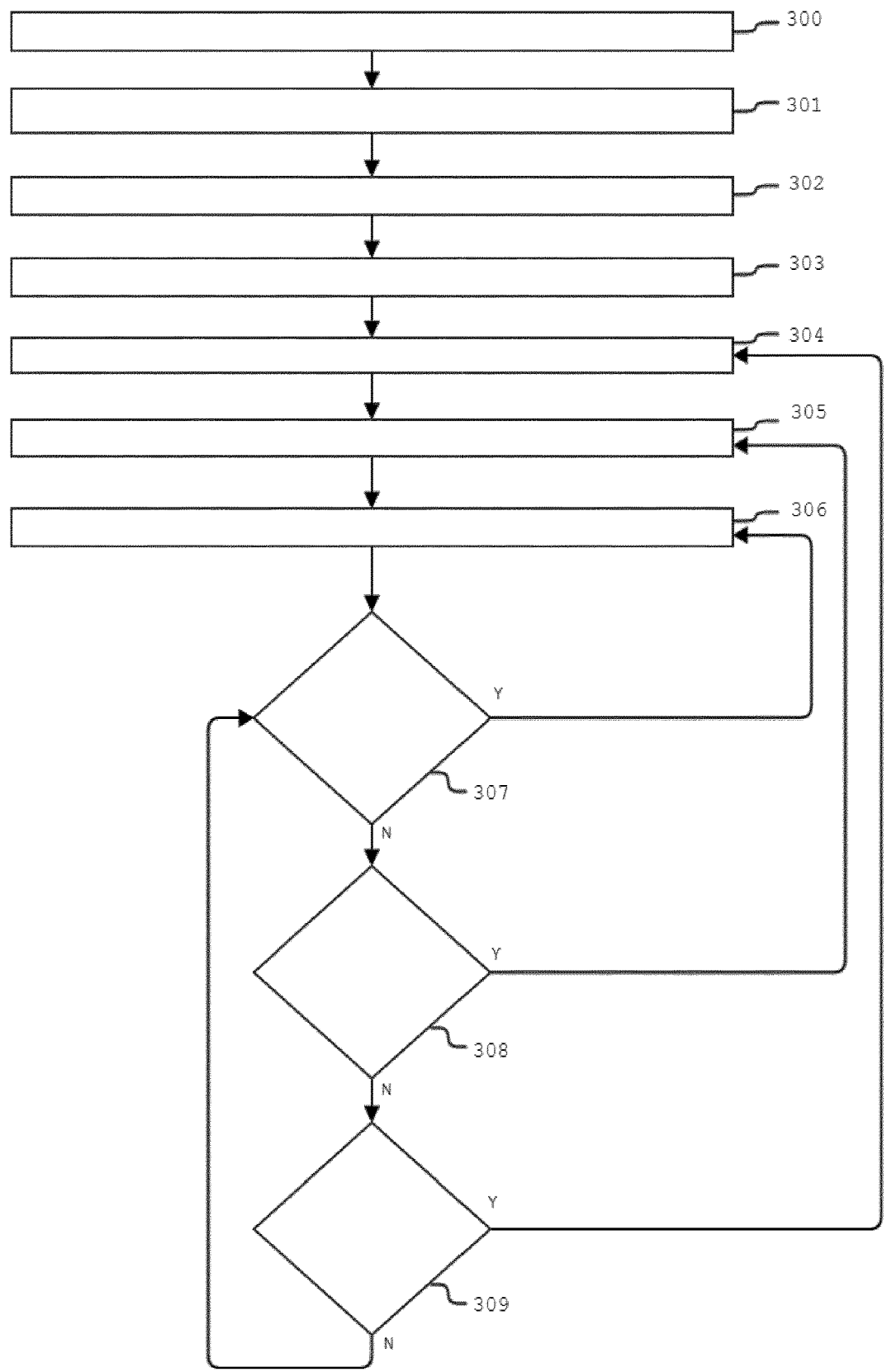
FIG. 3 shows a flow chart of an embodiment of the present invention.

FIG. 3 shows a flow chart of an embodiment of the present invention. Step 300 comprises defining all the use cases to be supported and in step 301 all sources and sinks that can participate in the use cases are identified and static labels can be associated to them if required.

The sources can be e.g. video or audio sources, but input devices such as keyboards can also be considered sources. The sources can deliver content as a stream (e.g. video stream, audio stream, stream of keyboard events, . . . ) or in a descriptive way (e.g. an html page).

The sinks, or destinations, can receive content and "render" it in a suitable way for a user to receive. E.g. a video stream can be shown on a display, or an audio stream can be outputted through loudspeakers, a stream of mouse events can be visualized using a cursor on a display, etc. A sink can also store or forward the received content—potentially after processing it.

Usually the rules of a use case can be active on a selected set of sources and sinks (for example all sources and sinks having a specific static label or session specific label or combination thereof—to be specified when the use case starts) and the sources and sinks that can be dynamically added to the use case while it is active (typically these can be sources and sinks of the BYODs connecting to participate in the use case).

In a next step 302, all source roles and sink roles and session specific labels that can be used in the use cases to be supported need to be defined, including the source roles and sink roles and session specific labels to be used for sources and sinks that are dynamically added while a use case is active. For example a camera source could have a source role "presenter camera" meaning that this camera will be filming the presenter. A display sink could have a sink role "confidence monitor main screen" meaning that this display will show a copy of the content shown on the main screen. For each sink role, an associated rule needs to be defined. This comprises defining the filter to be used to select the sources to be rendered but can as well comprise defining the rendering part that for example tells the sink how it should render the sources retained by the filter. In the case of video sink the rendering part could for example instruct the sink to render the video sources in a non-overlapping layout.

In step 303 for each use case to be supported, the sink role and session specific labels to be applied to each sink and the source role and session specific labels to be applied to each source are to be defined.

All items defined in the steps described till now can be stored by the service application.

In a next step 304 a use case can be activated. As a consequence, in step 305 all source roles, sink roles and session specific labels as defined for the use case in step 303 will be applied to the appropriate sources and sinks.

Step 306 comprises applying the rules corresponding to each sink role in the use case. This comprises applying the filter of the rule to any source participating in the use case and to instruct the sink to render the content received from the sources that are retained by the filter in a way as defined by the rendering part of the rule. For example, for setting up a parking surveillance room use case, all cameras filming the parking could have a source role "parking camera". All the cameras of a specific parking can be grouped together using a static label, e.g. "Parking A". A rule could then be applied to a display with sink role "parking surveillance monitor Parking A" having the following filter: [has source role "parking camera" and has label "Parking A"]. Applying the filter will retain all sources with source role "parking camera" and label "Parking A". Furthermore the rendering part of the rule could specify to auto-layout the matching sources on the display in a non-overlapping way.

Steps 307 and 308 show what can happen when sources and or sinks are dynamically removed from or added to an active use case. As shown by steps 307 and 306, removing sources and or sinks while a use case is active requires the rules to be re-applied to the remaining sinks in the use case so that the correct content is rendered. Adding new sources and or sinks to an active use case requires one extra step as shown by steps 308 and 305 because first the correct source roles and or sink roles and session specific labels need to be applied to the newly added sources and or sinks as shown in step 155. Dynamically adding or removing sources and or sinks typically happens when the use case comprises the use of BYODs. For example, upon connecting a BYOD to the service application, the camera and microphone of the BYOD can be registered as new sources and the display and the speakers of the BYOD can be registered as new sinks that participate in the use case. As users can connect or disconnect their BYOD at any time while the use case is active, the sources and sinks of the BYOD can be added or removed dynamically.

Step 309 shows what can happen in case a different use case needs to be activated. As shown in the flowchart, in such case we go back to step 304 and apply all source roles and sink roles and rules corresponding to the newly activated use case.

Figure 4:
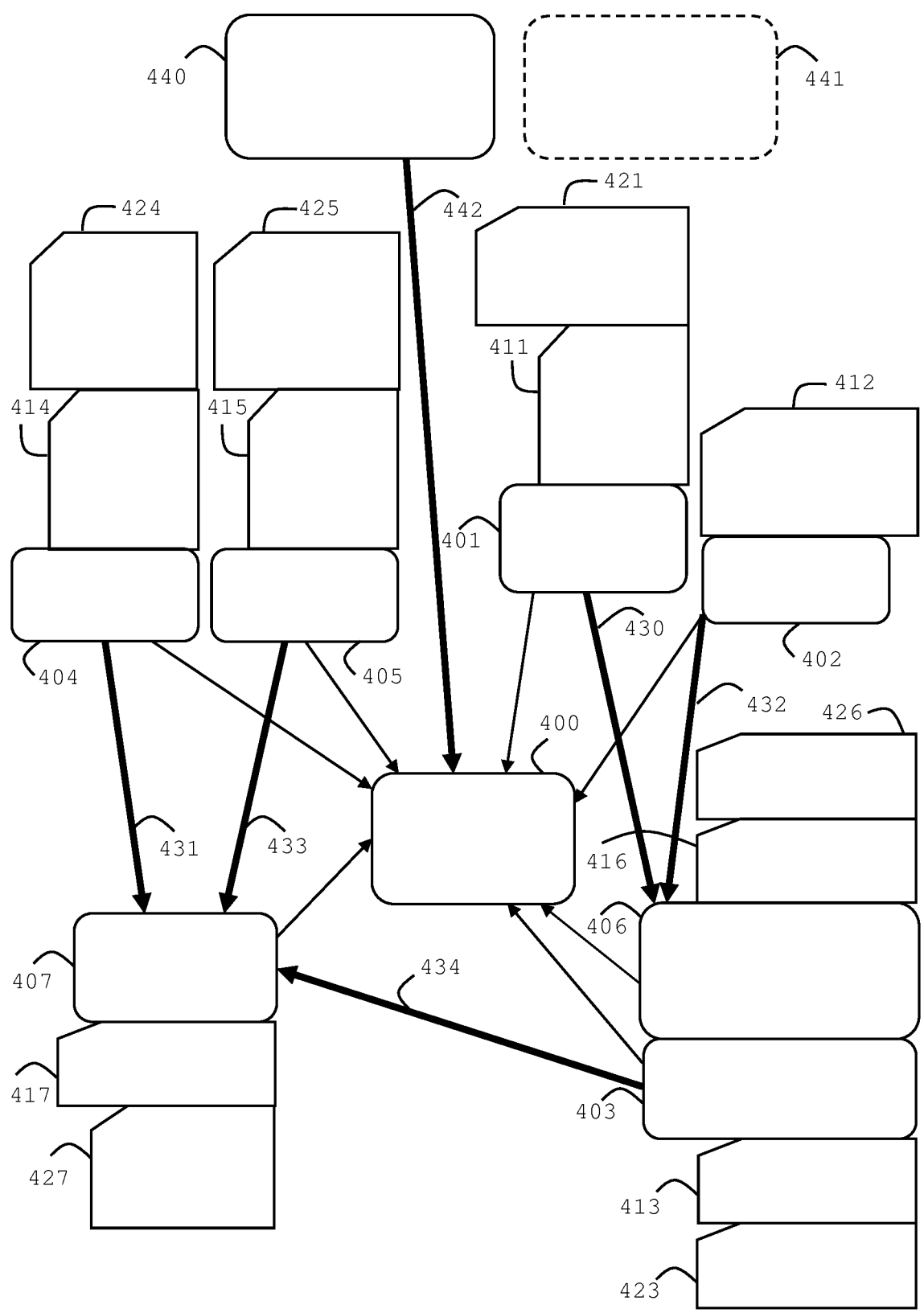
FIG. 4 shows an embodiment of the present invention comprising network devices.

FIG. 4 is an embodiment of the present invention showing an example of a use case "Recorded Active Learning Class"

440. A new instance of use case "Recorded Active Learning Class" that takes place in a classroom called "Classroom A" can be scheduled. This means that the use case is to be applied at the scheduled time on the sources and sinks of the network devices that are physically located in classroom "Classroom A". The as such created lecture can be called "Lecture A". The sources and sinks of classroom "Classroom A" can be easily identified in the network as they all have a static label "Classroom A". When the lecture starts, the for this use case "Recorded Active Learning Class" source- and sink roles as well as the for this use case defined session specific labels, will be applied to all sources and sinks participating in the lecture. In the example, there is only one session specific label which is the name of the lecture "Lecture A" 400. So all sources and sinks that participate in the lecture will receive their for the "Recorded Active Learning Class" use case defined role as well as a session specific label "Lecture A". Whenever a participant of the lecture connects a BYOD to the service application and joins the active lecture, the BYOD sources and sinks that are being registered can also receive session specific label "Lecture A". So the rules associated to the use case "Recorded Active Learning Class" are for this instance "Lecture A" applied to all sources and sinks having the extra attribute "Lecture A". For example there is a camera source 404 in the classroom with static label "Classroom A" 414 to which the source role "presenter camera" 424 is applied as well as the session specific label "Lecture A" 400 upon start of the lecture. A microphone source 405 with static label "Classroom A" 415 receives role "presenter microphone" 425 and session specific label "Lecture A" 400. A document camera source 401 with static label "Classroom A" 411 receives role "document camera" 421 and session specific label "Lecture A" 400. To present digital documents the presenter can use a source "BYOD" 402 that receives the for this use case defined source role "BYOD screen share" 412 and the session specific label "Lecture A" 400. There can be a sink "display" 406 with static label "Classroom A" 416 that receives sink role "master screen" 426 and session specific label "Lecture A" 400. The rule associated to this sink role 426 can have a filter [(source role equals "BYOD screen share" or equals "document camera") and (source has a label "Lecture A")] resulting in sources 401 and 402 streaming their respective content 430 and 432 to sink 406. Furthermore the rendering part of the rule associated to sink role "master screen" can instruct the sink to render the sources retained by the filter in a non-overlapping way. So sink 406 will act as "master screen" and show the content of the document camera 401 and BYOD 402, preferably after moderation by the presenter if the rule instructs so. A source "screen scraper" 403 with static label "Classroom A" 413 receiving source role "content" 423 and the session specific label "Lecture A" 400 can screen-scrape the video shown by sink 406 and stream the respective content 434 to a multi-track audio-video recorder sink 407 with static label "Classroom A" 417 that received sink role "lecture recorder" 427. The filter comprised by the rule associated with the sink role "lecture recorder" also causes the data 431 from camera source 404 with source role "presenter camera" 424 and the data 433 from a microphone source 405 with source role "presenter microphone" 425 to be streamed to the audio-video recorder sink 407. Other use cases such as use case "Huddle Space" 441 can be defined for this classroom and can be activated when an instance of this use case applied to this classroom starts. Note that while a certain use case is active on a selected set of sources and sinks (in this example all sources and sinks that have extra attribute "Lecture A"), other use cases may be active on other selections of sources and sinks.

Note that while a certain use-case is active, sources and sinks can dynamically be added or removed: E.g. a remote student can connect to a lecture and receive content from the lecture. For this to happen, the sources (e.g. camera and microphone) and sinks (e.g. display and speakers) of the BYOD of the student will be registered to the service application and receive source and sink roles respectively and extra attributes. The roles that are assigned to the sources and the sinks can be based upon the credentials used for connecting the device to the service application. Whenever sources or sinks are added or removed, the active rules will be re-applied and the data streams between sources and sinks will be adjusted where needed.

Instead of storing a sink role, the corresponding rule can be stored for the sink. In case the rule has no rendering part, this can be equivalent with storing a list of electronic device labels and a Boolean logic expression for the type 2 network device.

Figure 5:
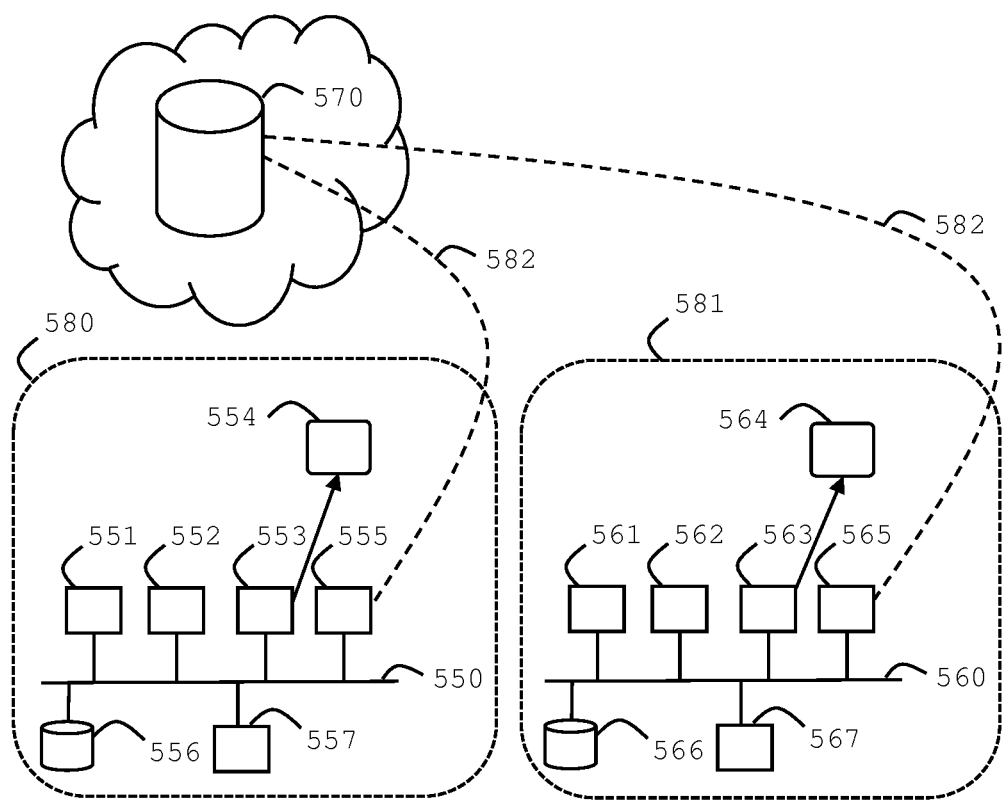
FIG. 5 shows block diagrams of an embodiment of the present invention.

FIG. 5 shows block diagrams of an embodiment of the present invention. There can be at least two network devices 580 and 581 connected over a network 582 with a server 570 in the cloud. The network devices 580/581 can each comprise a processor 551/561 (e.g. a Central Processing Unit, CPU), a work memory 552/562 and a source or sink 554/564 (e.g. a microphone, a loudspeaker, a display, . . . ) driven by a driver for the respective source or sink 553/563 (e.g. display driver, a Graphics Processing Unit, an audio card, etc. . . . ). A single network device can have multiple sources and or sinks 554/564, each having a corresponding driver 553/563. There can be a non-volatile memory 556/566 and means for input 557/567 (e.g. keyboard, mouse, touchscreen, touchpad, pen, microphone, gesture sensor, or any combination thereof). The sources and/or sinks can be connected to the network 582 by means of a network adapter or Network Interface Card, NIC 555/565 (e.g. Ethernet, WiFi). The processor 551/561 runs one or more processes that allow connecting the device to the service application and to register the device's sources and sinks. It also runs processes that control the rendering of data streams as instructed by the rules of the use case to which the device participates. An interactive dialog window is or can be implemented with, for example, a Java script put in the browser of a participant. The script code communicates with the server 570 which operates as a back end and hereby gets instructed if a dialog box should be launched. The browser can be displayed on a display connected to a network device (e.g. 580 or 581. The script or code can communicate with the server 570 acting as a back end (The JavaScript can get notified when a new poll is activated or when a poll has ended, for example by the JavaScript on a participant device checking with the back end (with a certain frequency) whether a poll is active. Or, alternatively, by an event sent by the back end.

Accordingly, network elements described with respect to embodiments of the present invention such as servers, display devices, back-end devices, rendering devices, streaming devices for example each optionally able to display a web browser optionally associated with a selection menu can be performed by a standalone digital processing device or can be embedded in another device. Such devices or methods can use a digital processing engine to carry out functions. The processing engine preferably has processing capability such as provided by one or more microprocessors, FPGA's, or a central processing unit (CPU) and/or a Graphics Processing Unit (GPU), and is adapted to carry out the respective functions by being programmed with software, i.e. one or more computer programmes. References to software can encompass any type of programs in any language executable directly or indirectly by a processor, either via a compiled or interpretative language such as Java. The implementation of any of the methods of the present invention can be performed by or assisted by logic circuits, electronic hardware, processors or circuitry which can encompass any kind of logic or analog circuitry, integrated to any degree, and not limited to general purpose processors, digital signal processors, ASICs, FPGAs, discrete components or transistor logic gates and similar.

Such devices may have memory (such as non-volatile memory, non-transitory computer readable medium, RAM and/or ROM), an operating system, optionally a display such as a fixed format display, ports for data entry devices such as a keyboard, a pointer device such as a "mouse", serial or parallel ports to communicate other devices, network cards and connections to connect to any of the networks.

The software can be embodied in a computer program product adapted to carry out the functions itemised below when the software is loaded onto the controller and executed on one or more processing engines such as microprocessors, ASIC's, FPGA's etc. devices for use with any of the embodiments of the present invention can incorporate a computer system capable of running one or more computer applications in the form of computer software.

The methods of embodiments of the present invention can be performed by one or more computer application programs running on the computer system by being loaded into a memory and run on or in association with an operating system such as Windows™ supplied by Microsoft Corp, USA, Linux, Android or similar. The computer system can include a main memory, preferably random access memory (RAM), and may also include a non-transitory hard disk drive and/or a removable non-transitory memory, and/or a non-transitory solid state memory. Non-transitory removable memory can be an optical disk such as a compact disc (CD-ROM or DVD-ROM), a magnetic tape, which is read by and written to by a suitable reader. The removable non-transitory memory can be a computer readable medium having stored therein computer software and/or data. The non-volatile storage memory can be used to store persistent information that should not be lost if the computer system is powered down. The application programs may use and store information in the non-volatile memory.

The software embodied in the computer program product is adapted to carry out the following functions when the software is loaded onto the respective device or devices and executed on one or more processing engines such as microprocessors, ASIC's, FPGA's etc.:
configuring network devices for streaming electronic media data over a computer network comprising a web server, a non-volatile memory and at least two type 1 network devices and at least one type 2 network device connected to the web server over the computer network.

The software embodied in the computer program product is adapted to carry out the following functions when the software is loaded onto the respective device or devices and executed on one or more processing engines such as microprocessors, ASIC's, FPGA's etc.:
the web server creating or receiving an electronic list of all network devices connected to said web server, each network device having an entry in the electronic list which entry is stored by the web server in said electronic list in the non-volatile memory.

The software embodied in the computer program product is adapted to carry out the following functions when the software is loaded onto the respective device or devices and executed on one or more processing engines such as microprocessors, ASIC's, FPGA's etc.:
configuring use-cases comprising:
for at least two use-cases, for each use-case
adding an electronic use-case label to entries of at least two type 1 network devices and at least one type 2 network device in the electronic list,
for each network device having the electronic use-case label, the web server storing in the non-volatile memory
for each network device of a first type, a first list of electronic device labels,
for each network device of a second type, the web server storing a second list of electronic device labels defining at least one condition wherein for each condition at least one out of a subset of the second list of electronic device labels is present or is not present in the first list of electronic device labels.

Optionally or alternatively the web server can store a Boolean logic expression comprising at least one Boolean operator out of "AND", "OR", "NOT", and at least one Boolean operand, wherein for each Boolean operand there is a dedicated item in said second list of electronic device labels.

The software embodied in the computer program product is adapted to carry out the following functions when the software is loaded onto the respective device or devices and executed on one or more processing engines such as microprocessors, ASIC's, FPGA's etc.:
activating a use-case comprising: the web server receiving a notification of a use-case selected by a user via inputs from a web page served by said web server,
for each network device having the selected electronic use-case label, automatically providing the web server with at least read access to the non-volatile memory,
for each pair of a type 1 network device and a type 2 network device, the web server reading the first and second lists of electronic device labels and the at least one condition if all conditions defined for the active use-case is fulfilled, and the web server can be configured to instruct the network devices for streaming electronic media data from the type 1 network device to the type 2 network device.

Optionally or alternatively the webserver can read the Boolean logic expression, for each operand of the Boolean logic expression.

The software embodied in the computer program product is adapted to carry out the following functions when the software is loaded onto the respective device or devices and executed on one or more processing engines such as microprocessors, ASIC's, FPGA's etc.:
optionally or alternatively if the dedicated item in the second list of electronic device labels is present in the first list of electronic device labels, the web server sets the operand to TRUE, otherwise it sets the operand to FALSE,
then optionally or alternatively the web server evaluates the Boolean logic expression and if the Boolean logic expression yields TRUE the web server instructs the network devices for streaming electronic media data from the type 1 network device to the type 2 network device.

The software embodied in the computer program product is adapted to carry out the following functions when the software is loaded onto the respective device or devices and executed on one or more processing engines such as microprocessors, ASIC's, FPGA's etc.:

for a selected use-case, while streaming electronic media data over the computer network, adding a network device to the network.

for the added network device the web server adding an entry in the electronic list of network devices, and adding an electronic use-case label to said entry.

The software embodied in the computer program product is adapted to carry out the following functions when the software is loaded onto the respective device or devices and executed on one or more processing engines such as microprocessors, ASIC's, FPGA's etc.:

if the added network device is of the first type, then the web server stores in the non-volatile memory, a first list of electronic device label.

if the added network device is of the second type, then the web server stores in the non-volatile memory, a second list of electronic device labels defining at least one condition wherein for each condition at least one out of a subset of the second list of electronic device labels is present or is not present in the first list of electronic device labels, optionally the web server stores a Boolean logic expression comprising at least one Boolean operator out of "AND", "OR", "NOT", and at least one Boolean operand, wherein for each Boolean operand there is a dedicated item in said second list of electronic device labels.

The software embodied in the computer program product is adapted to carry out the following functions when the software is loaded onto the respective device or devices and executed on one or more processing engines such as microprocessors, ASIC's, FPGA's etc.:

for the added network device having the selected electronic use-case label, automatically providing the web server with at least read access to the non-volatile memory.

for each pair of the added network device and a network device of a device type other than the added network device, having the use-case label of the selected use-case, the web server reading the first and second lists of electronic device labels and at least one condition if all conditions defined for the active use-case are fulfilled and the web server can be configured to instruct the network devices for streaming electronic media data from the type 1 network device to the type 2 network device.

Optionally or alternatively the web server reads the Boolean logic expression and optionally or alternatively for each operand of the Boolean logic expression, if the dedicated item in the second list of electronic device labels is present in the first list of electronic device labels, the web server sets the operand to TRUE, otherwise it sets the operand to FALSE.

Optionally the web server evaluating the Boolean logic expression and if the Boolean logic expression yields TRUE the web server instructs the network devices for streaming electronic media data from the type 1 network device to the type 2 network device.

The software embodied in the computer program product is adapted to carry out the following functions when the software is loaded onto the respective device or devices and executed on one or more processing engines such as microprocessors, ASIC's, FPGA's etc.:

the set of electronic device labels of the network device depends on the credentials or certificates used for connecting the network device to the web server.

instructing at least one type 2 network device that is receiving at least one electronic media data stream to start rendering the at least one electronic media data stream.

instructing at least one type 2 network device that is receiving at least one electronic media data stream, to not render at least one of the at least one received electronic media data stream.

The software embodied in the computer program product is adapted to carry out the following functions when the software is loaded onto the respective device or devices and executed on one or more processing engines such as microprocessors, ASIC's, FPGA's etc.:

the step of activating a use-case comprises the notification having a use-case selected by a user and at least one device label.

executing the step of activating the selected use-case for all network devices having the use-case label and at least one of the at least one device label.

The software embodied in the computer program product is adapted to carry out the following functions when the software is loaded onto the respective device or devices and executed on one or more processing engines such as microprocessors, ASIC's, FPGA's etc.:

while a first use-case is active, the web server receiving a notification comprising a second use-case selected by a user and at least one second device label being different from any of the at least one device label of the first use-case.

The web server executing the step of activating the selected second use-case for all network devices having the second use-case label and at least one of the at least one second device label.

The software embodied in the computer program product is adapted to carry out the following functions when the software is loaded onto the respective device or devices and executed on one or more processing engines such as microprocessors, ASIC's, FPGA's etc.:

activating a use-case comprises the notification having at least one first device label and at least one second device label and at least one third device label.

executing the step of activating the selected use-case comprising adding the at least one third device label to the device label list of all network devices having the use-case label and at least one of the at least one first device label and at least one of the at least one second device label.

Any of the above software may be implemented as a computer program product which has been compiled for a processing engine in any of the servers or nodes of the network or is written in an interpretive language such as Java that runs on a virtual machine such as the Java virtual machine. The computer program product may be stored on a non-transitory signal storage medium such as an optical disk (CD-ROM or DVD-ROM), a digital magnetic tape, a magnetic disk, a solid state memory such as a USB flash memory, a ROM, etc.

Figure 6:
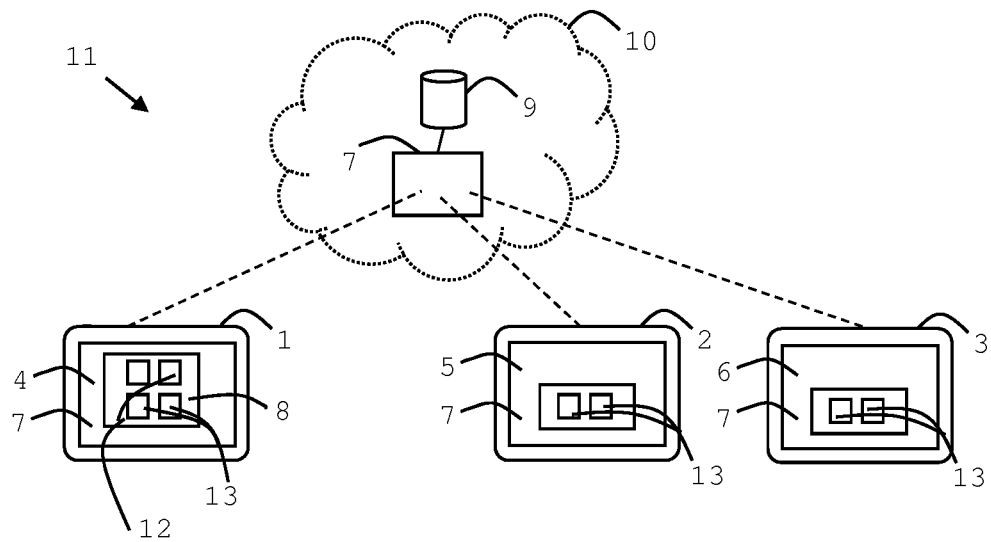
FIG. 6 shows a layout of an embodiment of the present invention comprising a plurality of web browsers connected in a collaboration session.

FIG. 6 shows a further embodiment of the present invention which can be an independent embodiment, comprising a collaborative system 11 having BYOD (Bring Your Own Device) devices 1, 2 and 3. BYOD 1, 2 or 3 can be processing devices with a display, for example laptops, mobile phones, smartphones, tablets, palm pads and the like. BYOD 1 can be of a first type having moderating permissions and BYOD 2 and 3 can be of a secondary type having participating permissions. BYOD 1, 2 and 3 can each output a web browser 4, 5 and 6 respectively. The web content 7 can be provided by a back end 9, which can be located in the cloud 10. Alternatively, the back end 9 can be located locally (not shown) on the same physical site as display devices 1, 2 and 3. The back end 9 can contain a database, a web server for serving html pages and an application for executing business logic and managing database access and to communicate with the devices connected to it. The BYOD 1 can instruct the back end 9 to provide the web content 7 to any web browser in the collaboration system. The web content can comprise arbitrary material, e.g. presentations, images, videos, live streams, etc., and can be located anywhere on the internet.

The moderator operating BYOD 1 can launch a digital interactive dialog window by entering a selection environment 8 on the BYOD. This environment comprises a set of pre-defined digital interactive dialog windows types, for example 12, 13, each comprising choices, e.g. for example yes/no, true/false or arbitrary amount of alternative 1, . . . , n. By selecting the wanted digital interactive dialog window type in a selection environment, for example type 13, the corresponding digital interactive dialog window is launched as-is onto BYOD devices 2 and 3. The launch can be in less than 5 seconds such as in 2 seconds plus or minus 1 second. The digital interactive digital dialog window corresponding to type 13 for use on BYOD devices 2 and 3, can have means for interacting 14 having elements such as "buttons" or "icons". The means for interacting 14 is an image including graphics and/or text that can be combined with, juxtaposed with or overlaid onto the content (if any) that is already displayed on devices 2 and 3. One advantageous feature is that the digital interactive dialog window alternatives can be kept "neutral" without comprising any content of the specific assignment it answers. In this way the digital interactive dialog window can repeatedly be used to any new question without modification.

The alternatives in a digital interactive dialog window can be answers to a question or an assignment, which can be given in the web content 7, for example integrated with the presentation. Alternatively, the assignment can be given via an audio stream, or e.g. by the moderator reading the question out loud or playing an audio and/or video recording.

Figure 7:
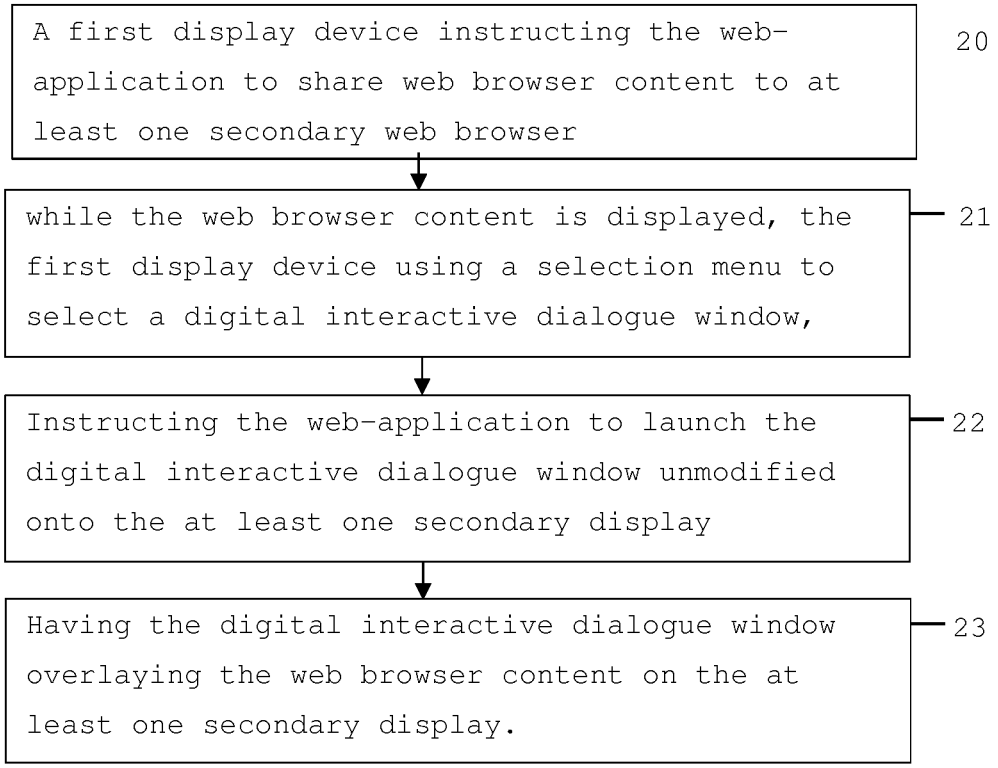
FIG. 7 shows a flow chart describing an embodiment of the present invention.

The web browser content provided to the different BYOD's can include one or more webRTC streams (including video and audio), static images (e.g. JPEG) or video streams (e.g. MJPEG type of content), which might be served by a system outside of the web application FIG. 7 shows a flow chart of an embodiment of the present invention. In step 20, a first display device is instructing the back end to share web browser content to at least one second web browser. In step 21, while the web browser content is displayed in the web browsers, a digital interactive dialog window type is selected in a selection menu and, in step 22, the web-application is instructed to launch the selected digital interactive dialog window unmodified onto the at least one secondary display. "Unmodified" means that there is no further modification of the digital interactive dialog window after the selection has been made, but it is launched to a secondary display as-is in the way it is defined in the back end. This allows a launch in less than 5 seconds such as in 2 seconds plus or minus 1 second. In step 23 the digital interactive dialog window is overlaying the web browser content on the at least one secondary display.

Figure 8:
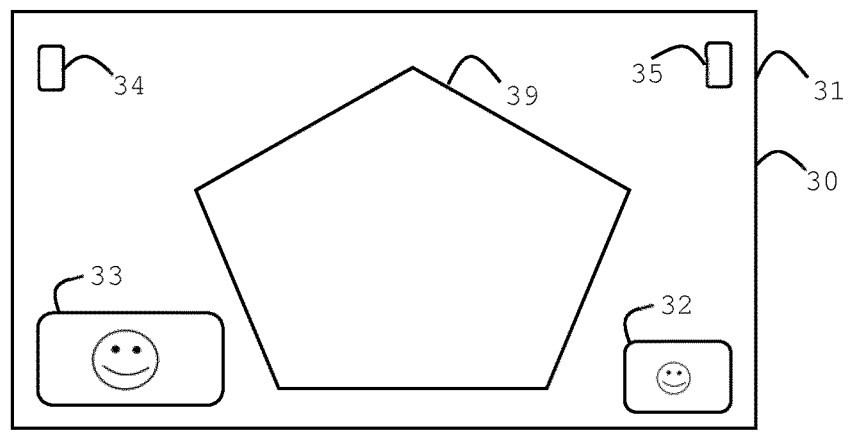
FIG. 8 shows a snap shot of a collaboration situation.

FIGS. 8 to 13 show examples of embodiments of the present invention. FIG. 8 comprises a screen shot from a session as described with respect to FIGS. 6 and 7. In FIG. 8, the web browser 30 comprises web content 31 which in turn comprises web content object 39, a "self-image" 32 and a live image 33 of the moderator, some additional functions are present, for example "raise hand" 34 or "silent question" 35. The latter brings up a text input field that allows to post a question.

Figure 9:
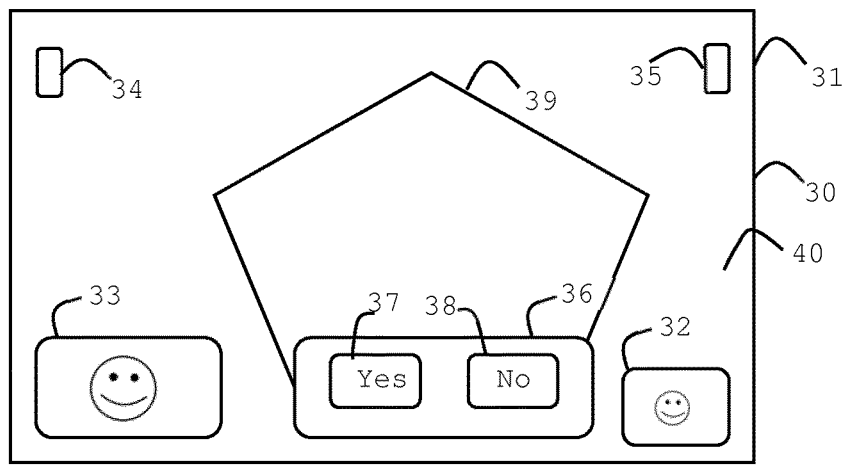
FIG. 9 shows an embodiment of the present invention comprising a digital interactive dialog window overlaid onto existing web browser content.

FIG. 9 comprises a screen shot of a secondary display when the moderator has launched a digital interactive dialog window 36. In this example the digital interactive dialog window 36 has the alternatives "Yes" 37 and "No" 38. The digital interactive dialog window 36 is overlaid onto the original web browser content 31 which does not need to be scaled. The web content 30 can comprise a web content object 39 neighbored by one or several coloured or transparent area 40 (which can comprise a multiple of areas). This neighbouring area 40 can still be considered to be part of the web content 31.

Figure 10:
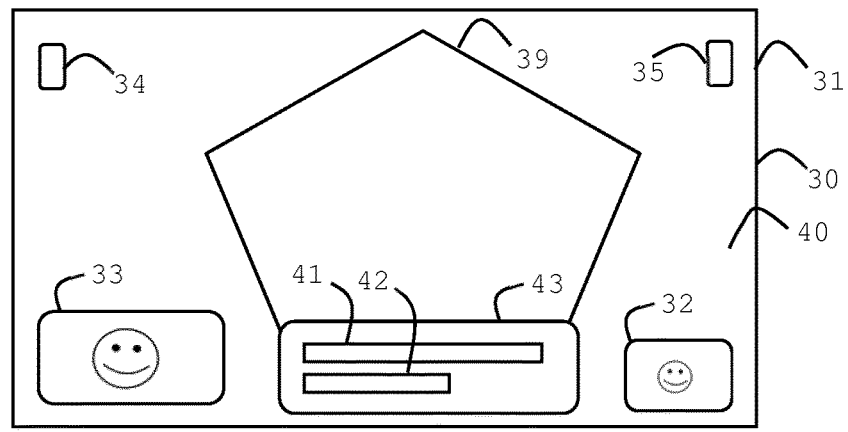
FIG. 10 shows an embodiment of the present invention comprising the monitoring the collection of inputs.

FIG. 10 comprises a screen shot of a secondary display when the participants have provided their input via the digital interactive dialog window 36 and the result 43 can then be displayed, e.g. with the bar 41 indicating the number of "Yes" and the bar 42 indicating the number of "No".

Figure 11:
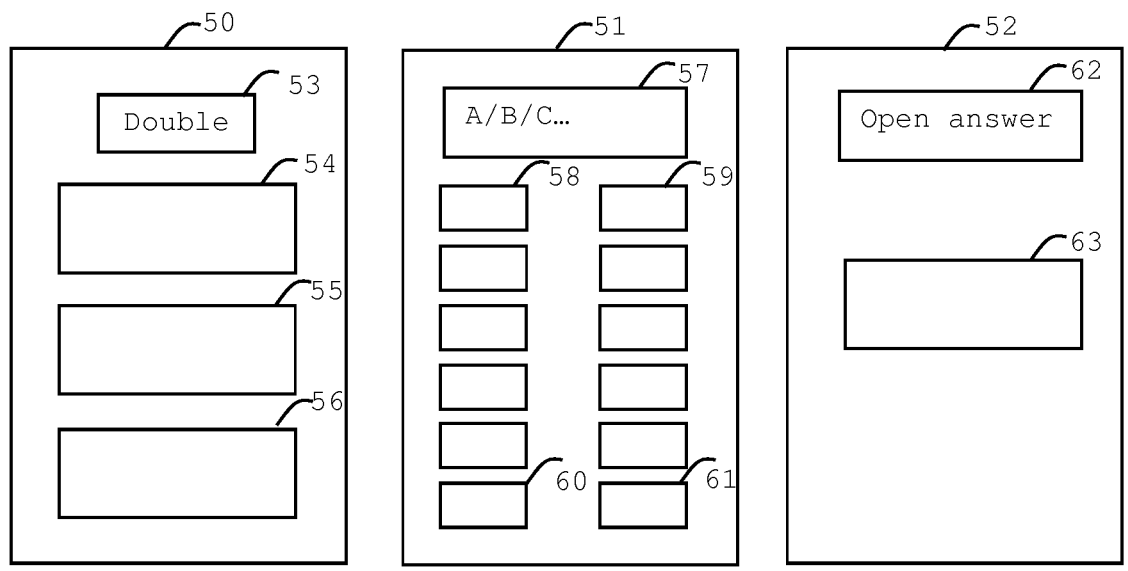
FIG. 11 shows an embodiment of the present invention comprising an interactive dialog windows.

FIG. 11 comprises a screen shot of a first display showing a selection environment with three different interactive dialog windows 50, 51 and 52. This selection environment allows the moderator to select a digital interactive dialog window type 50, 51 or 52. In this example, type 50 comprises a collection of binary alternatives which can be e.g. Like/Dislike 54, True/False 55 and Agree/Disagree 56. The collection can have a title 53, e.g. "Double". The type 51 can comprise multiple choice options with increasing number of alternatives. The first values 58 and 59 can be binary, e.g. A/B or ½, and the last values 60 and 61, e.g. A/B/ . . . /n or ½/ . . . /n. The last type 52 can comprise a free-text open answer, e.g. with a limited number of characters. The types 51 and 52 can be given titles 57 and 62 respectively.

Figure 12:
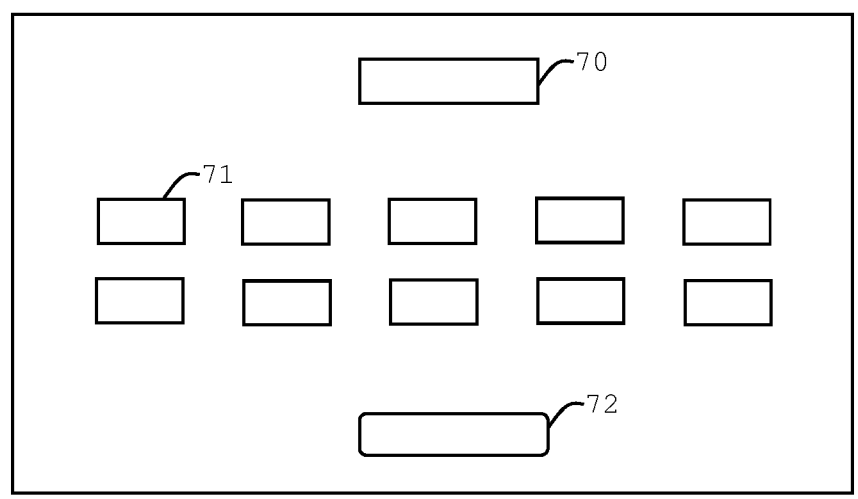
FIG. 12 shows an embodiment of the present invention comprising time choices for a selected interactive dialog window.

If for example the type True/False is chosen, FIG. 12 shows how the time parameters can be set. The headline 70 indicates the choice of type (e.g. "True/False") and the time interval are listed in the fields below, only the first one is numbered with 71. The different choices can for example be 10 seconds, 20 seconds, 30 seconds, 1 minute, 5 minutes, 10 minutes, 20 minutes, 30 minutes, 1 hour, 2 hours. Once a time interval is chosen, the interactive dialog window can be launched by engaging field 72. Optionally the step of choosing a time interval can be skipped and a default duration can be used.

Figure 13:
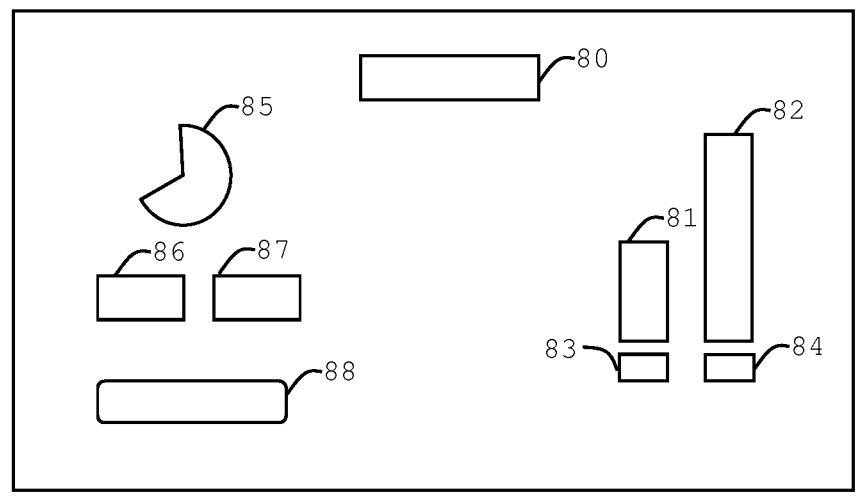
FIG. 13 shows an embodiment of the present invention comprising the monitoring of the collection of inputs.

FIG. 13 shows an example of how the interactive session can be monitored during the collection of the different inputs from the participants. The title 80 can indicate which digital interactive dialog window type is in use. The pie chart 85 can indicate elapsed time so far and the fields 86 and 87 gives the possibility to add time of different amounts. The bars 81 and 82 indicates the result so far for the choices 83 and 84 respectively (for example 83 can be "Yes" and 84 can be "No"). The collection of the participant input can be stopped by selecting field 88.

In one embodiment of the present invention there is provided means for recording and storing the screen content as well as possible audio related to it. For example, consider a classroom scenario where a teacher launches a poll by saying the question out loud and launching a digital interactive dialog window on top of a presentation, and the students provides their responses to the poll. It is then possible to record and store the presentation, or a snapshot of the content being presented when the poll starts,
the overlaid digital interactive dialog window type,
an audio file where the teacher speaks out the question, and
the students' responses.

All items should be recorded so that the context of the real situation is preserved and can be revisited. The collected data can be stored in the back end 9.

In order to increase the engagement of the participant into the voting process, the digital interactive dialog window can be implemented as a semi-modal dialog that overlays any other content that might be present at the location of the dialog. As such the dialog can be positioned on top, and the content it might overlay would not be accessible anymore for the participant. The appearance of the dialog in a participant browser can be triggered by the moderator using the "selection menu" and the participant can preferably not close the dialog as long as no vote has been placed. In case the duration of the voting process is controlled by a timer, a progress bar or counter can indicate the time left for voting to the participant. Alternatively the voting process can be ended by the moderator, or automatically upon receipt of all votes. Not being fully "modal", "Semi-modal" can mean that certain buttons or input fields that are present at positions not covered by the dialog can still be functional. For example, a button for asking for help from the moderator, or a text input field allowing posting a message to the moderator. For example, a participant might ask the moderator to repeat the question if it was not fully understood.

The digital interactive dialog window can be written by JavaScript (or similar code) and can be embedded in the html page and served to a participant browser. The browser can be displayed on a display connected to a network device 1. The script or code can communicate with the back end. The JavaScript can get notified when a new poll is activated or when a poll has ended, for example by the JavaScript on a participant device checking with the back end (with a certain frequency) whether a poll is active. Or, alternatively, by an event sent by the back end. In order to realize the semi-modal dialog when a poll is activated, the above mentioned embedded JavaScript code can insert the semi-modal dialog into a document object model (DOM). The DOM can be rendered by the browser in such a way that the semi-modal dialog is rendered on top of any other content that might be present at the display location of the dialog. So-called "style properties" can describe the rendering style to be used to render the objects in the document object model. Such style properties can be used to render the dialog on top of other content on the display, and to control the layering (for example by using the "z-index property"). Style properties can be embedded inside the html document, or the html page can refer to external "cascading style sheet" (CSS) documents, which can contain the style properties. Other controls, such as buttons and text input fields that are not at the same position as the dialog, can still be functional as they are not overlaid by the dialog.

Upon voting, the JavaScript embedded in the html page served to the participant can send the voting result to the back end. The back end can then generate the statistics of the votes and generate for example charts to visually represent the results. The moderator can then present and discuss the results with the participants and stimulate the participants' engagement. The voting result of each participant can also be stored in the database for later retrieval, for example to calculate a score for each of the participants. The score or statistics for each participant can be provided in the context of the group score or statistics i.e. of the whole group. Each, some or all participants can be informed of their performance, e.g. individual performance or their position within the group. Hence embodiments of the present invention can allow sending user specific results and statistics in the context of results and statistics for all participants to at least one user.

Figure 14:
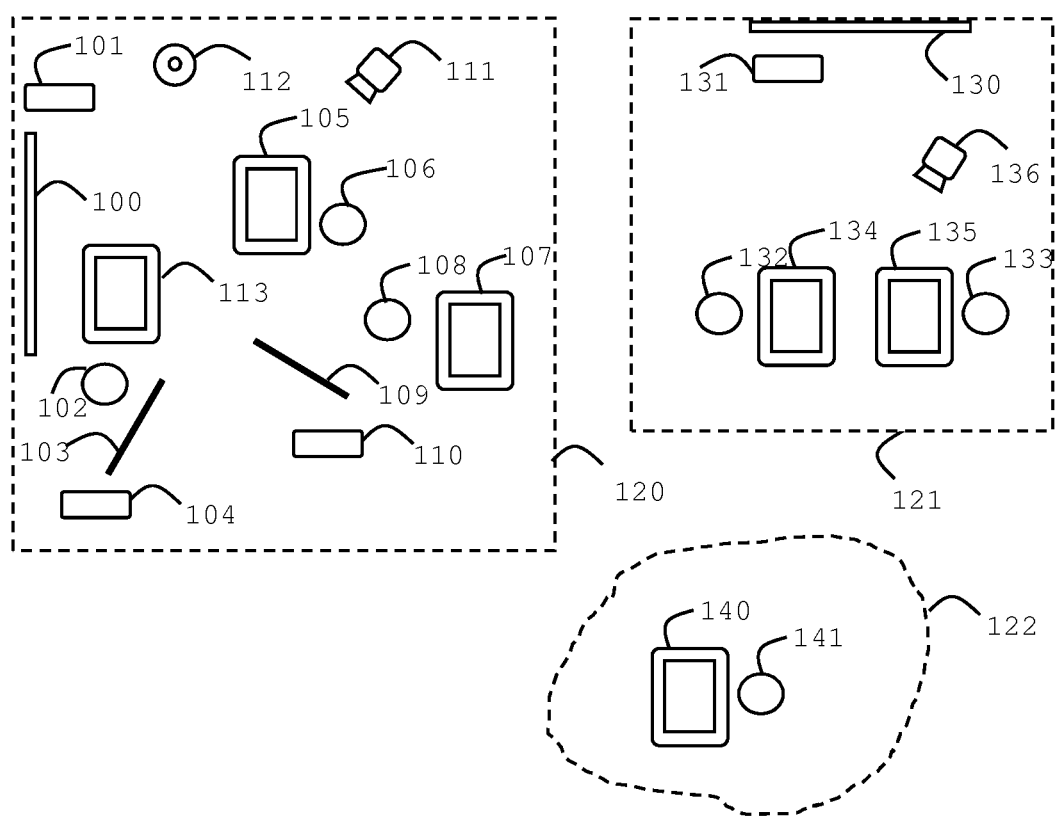
FIG. 14 shows an embodiment of the present invention where BYOD's in different meeting rooms are connected in a collaboration session.

FIG. 14 (which is identical to FIG. 1 except adapted to carry out this embodiment) shows an embodiment of the present invention when the BYOD devices are distributed across several sites, for example within an educational context. The sites comprise lecture rooms 120 and 121, and an off-site location 122. The BYOD's 105 and 107 are operated by participant users 106 and 108 respectively. The moderator or teacher 102 is working on first BYOD 113, the main screen 100, which is driven by a network device 101 can be used to display the same content that is shared to the BYOD's 105 and 107 and to display the results of the voting, or poll when the voting or polling has finished. The moderator 102 also might have a self-screen 103 (driven by network device 104) where he/she can see the content the participants receive. Room 120 can be equipped with a video camera 111 and a microphone 112. If the room is e.g. a big auditorium, it can be equipped with far-view displays like 109 (driven by network device 110).

The room 121 can be an "overflow-room" (in case there are not enough places in room 120) having a main screen 130 (driven by a network device 131). In the present example, room 121 is occupied with users 132 and 133, operating BYOD's 134 and 135 respectively. This room also has a video camera 136. Additionally there can be a BYOD located on an off-site location 122, e.g. a participant home, where the participant 141 can operate the BYOD 140.

Figure 15:
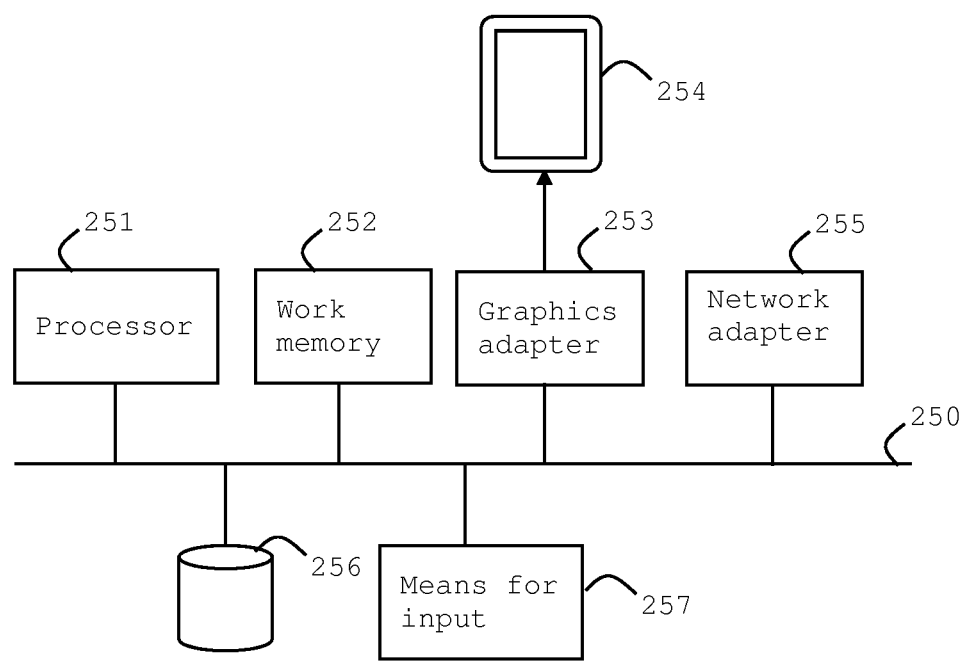
FIG. 15 shows a block diagram of an embodiment of the present invention.

FIG. 15 shows block diagrams of an embodiment of the present invention. FIG. 15 is the same as FIG. 5 with the exception that it is adapted to the present embodiment. There can be at least two BYOD's 280 and 281 connected over a network 282 with a server 270 in the cloud. The BYOD's can each comprise a processor 251/261 (e.g. a Central Processing Unit, CPU), a work memory 252/262 and a display unit 254/264 driven by a graphics adapter 253/263 (e.g. a display driver or a Graphics Processing Unit, GPU). There can be a non-volatile memory 256/266 and means for input 257/267 (e.g. keyboard, mouse, touchscreen, touchpad, pen, microphone, gesture sensor, or any combination thereof). The display unit 254/264 can be e.g. a liquid crystal display, a light emitting diode display or organic light emitting diode display. The devices can be connected to the network 282 by means of a network adapter or Network Interface Card, NIC 255/265 (e.g. Ethernet, WiFi). The processor 251/261 runs a web browser application that is displayed on display units 254/264 and that receives content from the back end running on server 270. The elements of each BYOD are connected via a system bus 250/260 respectively. The content sent to the web browsers is controlled by the back end running on server 270 and can be arbitrary (can include presentations, documents, images, webpages, videos, live camera streams, audio streams, or any combination thereof) and can be combined with digital interactive dialog windows. The content can optionally be stored in the non-volatile memory 256/266 and moved to the work memory 252/262 when the web browser application calls for it. A user operating the BYOD 280 or 281 can interact with the system by using the means for input 257 or 267 respectively.

Embodiments described with reference to FIGS. 1 to 5 provide a method for configuring a system on which a method described with reference to FIGS. 6 to 15 can be run. This allows to stream media in parallel with a dialog box (which resides in a web browser). A source can be referred to as a "type 1 network device", a sink can be referred to as a "type 2 network device".

A source role can be stored as an "electronic device label for that role". A sink role can be stored as an "electronic device label for that role". Accordingly, embodiments of the present invention provide a method for combining a digital interactive dialog window with content shown by web browsers, which is for use with a network having a first network device having a first device label displaying a first web browser and being configured to receive first content from a back end accessed by a first set of credentials, the first credentials being associated with a selection menu for digital interactive dialog window types, the first network device having a first device label being configured to select a digital interactive dialog window type from a selection menu and communicating the digital interactive dialog window type to the network.

The method can comprise displaying a second web browser on at least one secondary network device having a second device label which is in communication or connected to the network, the second web browser being configured to receive second content from the back end accessed by a second set of credentials, the second credentials being associated with a set of one or more digital interactive dialog windows, having the second content displayed on the second web browser on the at least one secondary network device having a second device label and while the second content is being displayed, a digital interactive dialog window type is launched as a corresponding unmodified digital interactive dialog window onto the second web browser of the at least one secondary network device having a second device label, so that the digital interactive dialog window is combined with, juxtaposed with or overlaid onto the second web browser content on the at least one secondary network device having a second device label.

Similarly embodiments of the present invention provide a system for creating arrangements of a digital interactive dialog window for use with a network having a first network device having a first device label being associated with first credentials and displaying a first web browser content on a first web browser, the first network device having a first device label being associated with a selection menu comprising a set of digital interactive dialog window type.

In addition the system can comprise:
a second network device having a second device label displaying a second web content on a second web browser, the second network device having a second device label being in communication with or connected to the network and for a selected digital interactive dialog window type, the second network device having a second device label being configured to display an arrangement of an unmodified digital interactive dialog window corresponding to the selected digital interactive dialog window type combined with, juxtaposed with or overlaid onto the second web browser content.

Network elements such as servers, back ends, display devices optionally being associated with different credentials and for example each able to display a web browser as well as a display device being associated with a selection menu comprising a set of digital interactive dialog window types, which can select or show a digital interactive dialog window type as well as display devices comprising an arrangement of the corresponding unmodified digital interactive dialog window combined or juxtaposed or overlaid onto the web browser content and methods according to embodiments of the present invention can be performed by a standalone digital processing device or can be embedded in another device. Such devices or methods can use a digital processing engine to carry out functions. The processing engine preferably has processing capability such as provided by one or more microprocessors, FPGA's, or a central processing unit (CPU) and/or a Graphics Processing Unit (GPU), and is adapted to carry out the respective functions by being programmed with software, i.e. one or more computer programmes. References to software can encompass any type of programs in any language executable directly or indirectly by a processor, either via a compiled or interpretative language such as Java. The implementation of any of the methods of the present invention can be performed by logic circuits, electronic hardware, processors or circuitry which can encompass any kind of logic or analog circuitry, integrated to any degree, and not limited to general purpose processors, digital signal processors, ASICs, FPGAs, discrete components or transistor logic gates and similar.

Such devices may have memory (such as non-transitory computer readable medium, RAM and/or ROM), an operating system, optionally a display such as a fixed format display, ports for data entry devices such as a keyboard, a pointer device such as a "mouse", serial or parallel ports to communicate other devices, network cards and connections to connect to any of the networks.

The software can be embodied in a computer program product adapted to carry out the functions itemised below when the software is loaded onto the controller and executed on one or more processing engines such as microprocessors, ASIC's, FPGA's etc. devices for use with any of the embodiments of the present invention can incorporate a computer system capable of running one or more computer applications in the form of computer software.

The methods of embodiments of the present invention can be performed by one or more computer application programs running on the computer system by being loaded into a memory and run on or in association with an operating system such as Windows™ supplied by Microsoft Corp, USA, Linux, Android or similar. The computer system can include a main memory, preferably random access memory (RAM), and may also include a non-transitory hard disk drive and/or a removable non-transitory memory, and/or a non-transitory solid state memory. Non-transitory removable memory can be an optical disk such as a compact disc (CD-ROM or DVD-ROM), a magnetic tape, which is read by and written to by a suitable reader. The removable non-transitory memory can be a computer readable medium having stored therein computer software and/or data. The non-volatile storage memory can be used to store persistent information that should not be lost if the computer system is powered down. The application programs may use and store information in the non-volatile memory.

The software embodied in the computer program product is adapted to carry out the following functions when the software is loaded onto the respective device or devices and executed on one or more processing engines such as microprocessors, ASIC's, FPGA's etc.:
combining a digital interactive dialog window with content shown by web browsers, or
juxtaposing a digital interactive dialog window with content shown by web browsers, or
overlaying a digital interactive dialog window with content shown by web browsers.

The software embodied in the computer program product is adapted to carry out the following functions when the software is loaded onto the respective device or devices and executed on one or more processing engines such as microprocessors, ASIC's, FPGA's etc.:

receiving content by a web browser of a first display from a back end accessed by a first set of credentials,
receiving content by a web browser of at least one secondary display from a back end accessed by a second set of credentials.

The software embodied in the computer program product is adapted to carry out the following functions when the software is loaded onto the respective device or devices and executed on one or more processing engines such as microprocessors, ASIC's, FPGA's etc.:
the first credentials being associated with a selection menu and the second credentials being associated with a set of digital interactive dialog windows,
displaying the digital interactive dialog window in a semi-modal mode or a modal mode.

The software embodied in the computer program product is adapted to carry out the following functions when the software is loaded onto the respective device or devices and executed on one or more processing engines such as microprocessors, ASIC's, FPGA's etc.:
instructing content to be displayed on a web browser on the at least one secondary display,
while the content is displayed, using the selection menu to select a digital interactive dialog window type,
launching the corresponding digital interactive dialog window unmodified onto the web browser of the at least one secondary display, so that the digital interactive dialog window is combined with, juxtaposed with or overlaid on the web browser content on the display.

The software embodied in the computer program product is adapted to carry out the following functions when the software is loaded onto the respective device or devices and executed on one or more processing engines such as microprocessors, ASIC's, FPGA's etc.:
while launching the digital interactive dialog window, the web browser content on at least one of the secondary displays covers the full display area.
while launching the digital interactive dialog window, it overlaps the web browser content on each of the at least one secondary display with 1 to 100 percent.
displaying the digital interactive dialog window in semi-modal mode or a modal mode.

The software embodied in the computer program product is adapted to carry out the following functions when the software is loaded onto the respective device or devices and executed on one or more processing engines such as microprocessors, ASIC's, FPGA's etc.: streaming audio,
the web browser on the at least one secondary display rendering streaming audio, delivering a message associated with the interactive dialog window using audio and/or video streaming.

The software embodied in the computer program product is adapted to carry out the following functions when the software is loaded onto the respective device or devices and executed on one or more processing engines such as microprocessors, ASIC's, FPGA's etc.:
incorporating a message associated with the digital interactive dialog window, in the web-based content,
launching the digital interactive dialog window while providing related material by human speech.

The software embodied in the computer program product is adapted to carry out the following functions when the software is loaded onto the respective device or devices and executed on one or more processing engines such as microprocessors, ASIC's, FPGA's etc.:
a back end is deployed in the cloud or on-premise,
a back end comprises a database, (for content, results, user information, statistics . . . ) web browser content is any of presentation, document, image, webpage, video, live camera stream, audio stream, or any combination thereof,
an interactive dialog window is any of a poll, a chat, voting buttons, voting sliders, text input fields.

Any of the above software may be implemented as a computer program product which has been compiled for a processing engine in any of the servers or nodes of the network. The computer program product may be stored on a non-transitory signal storage medium such as an optical disk (CD-ROM or DVD-ROM), a digital magnetic tape, a magnetic disk, a solid state memory such as a USB flash memory, a ROM, etc.

The invention claimed is:

1. A method for combining a digital interactive dialog window with content shown by web browsers as determined by use cases, which method is for use with a network having at least one first network device having a first device label and a first display displaying a first web browser and being configured to receive first content from a back end accessed by a first set of credentials, the back end being a process or combination of processes that is adapted to run on a web server hardware, the first credentials being associated with a selection menu for digital interactive dialog window types, the at least one first network device being configured to select a digital interactive dialog window type from a selection menu and for communicating the digital interactive dialog window type to the network, the method comprising:
displaying a plurality of second web browsers each on one of a plurality of secondary displays of a plurality of secondary network devices each having a second device label, the plurality of secondary network devices being in communication or connected to the network, the first network device and the secondary networks device being selected for a selected use case based on the label carried by the first network device and/or the secondary network devices, wherein only the first network device and/or the secondary network devices with the respective labels will be selected for the selected use case, the plurality of second web browsers being configured to receive second content from the back end accessed by a second set of credentials, the second credentials being associated with a set of one or more digital interactive dialog windows,
having the second content displayed on each of the plurality of second web browsers on the plurality of secondary displays, and while the second content is being displayed, a digital interactive dialog window is launched as a corresponding unmodified digital interactive dialog window onto the plurality of second web browsers of the plurality of secondary displays, so that the digital interactive dialog window is combined with, juxtaposed with or overlaid onto the second web browser content on the plurality of secondary displays of the plurality of secondary network devices.

2. The method according to claim 1, wherein each of the more than one secondary display has a full display area, and the method comprising while launching the digital interactive dialog window, the second web browser content displayed on the more than one secondary display covering the full display area.

3. The method according to claim 1, comprising while launching the digital interactive dialog window, the digital interactive dialog window overlaps the second web browser content on the at least one secondary display with 1 to 100 percent.

4. The method according to claim 1, comprising displaying of the digital interactive dialog window as semi-modal or modal.

5. The method according to claim 1, comprising streaming audio to the at least one second display.

6. The method according to claim 5, comprising the second web browser on the more than one secondary display rendering the streaming audio.

7. The method according to claim 1, comprising receiving a message associated with the digital interactive dialog window using audio and/or video streaming.

8. The method according to claim 1, comprising receiving a message associated with the digital interactive dialog window, in the second content.

9. The method according to claim 1, comprising launching the digital interactive dialog window while receiving a message associated with the interactive dialog by human speech to a user of a secondary display.

10. The method according to claim 1, comprising a biometric sensor having processing power, a LookUp Table (LUT) grouped into levels of the electrical signal, each level being registered with a value, the method comprising the steps of the biometric sensor measuring the physical property of the human characteristics and transforming the measured signal into an electrical signal, finding the level of the electrical signal in the LUT and extracting the corresponding value.

11. The method according to claim 1, wherein the computer network further comprising a web server, and a non-volatile memory, comprising the steps of:
the web server creating or receiving an electronic list of all network devices connected to said web server, each network device having an entry in the electronic list which entry is stored by the web server in said electronic list in the non-volatile memory, and
configuring use-cases comprising:
for at least two use-cases, for each use-case adding an electronic use-case label to entries of at least two type first network devices and at least one type second network device in the electronic list,
for each network device having the electronic use-case label,
the web server storing in the non-volatile memory,
for each first network device, a first list of electronic device labels,
for each second network device, the web server storing a second list of electronic device labels defining at least one condition wherein for each condition at least one out of a subset of the second list of electronic device labels is present or is not present in the first list of electronic device labels,
the step of activating a use-case comprising:
the web server receiving a notification of a use-case selected by a user via inputs from a web page served by said web server,
for each network device having the selected electronic use-case label,
automatically providing the web server with at least read access to the non-volatile memory, for each pair of a first network device and a second network device,
the web server reading the first and second lists of electronic device labels and the at least one condition if all conditions defined for the active use-case are fulfilled.

12. The method according to claim 11, further comprising, for a selected use-case, while streaming electronic media data over the computer network, adding a network device to the network, and for the added network device:
the web server adding an entry in the electronic list of network devices, and adding an electronic use-case label to said entry,
if the added network device is a first network device,
then the web server storing in the non-volatile memory, a first list of electronic device labels,
if the added network device is a second network device,
then the web server storing in the non-volatile memory, a second list of electronic device labels and defining at least one condition wherein for each condition at least one out of a subset of the second list of electronic device labels is present or is not present in the first list of electronic device labels,
for the added network device having the selected electronic use-case label, automatically providing the web server with at least read access to the non-volatile memory,
for each pair of the added network device and a network device of a device type other than the added network device, having the use-case label of the selected use-case,
the web server reading the first and second lists of electronic device labels and the at least one condition if all conditions defined for the active use-case are fulfilled.

13. The method according to claim 11, wherein the set of electronic device labels of the network device depends on the credentials or certificates used for connecting the network device to the web server.

14. The method according to claim 11, further comprising instructing at least one first network device that is receiving at least one electronic media data stream to start rendering the at least one electronic media data stream, and/or instructing at least one second network device that is receiving at least one electronic media data stream, to not render at least one of the at least one received electronic media data stream and/or instructing at least one second network device that is receiving at least one electronic media data stream to start rendering the at least one electronic media data stream in accordance with a set of rules.

15. The method according to claim 11, wherein the step of activating a use-case comprises the notification having a use-case selected by a user and at least one device label,
and executing the step of activating the selected use-case for all network devices having the use-case label and at least one of the at least one device label and/or wherein the step of activating a use-case comprises the notification having at least one first device label and at least one second device label and at least one third device label,
and executing the step of activating the selected use-case comprises adding the at least one third device label to the device label list of all network devices having the use-case label and at least one of the at least one first device label and at least one of the at least one second device label.

16. The method according to claim 15, further comprising while a first use-case is active, the web server receiving a notification comprising a second use-case selected by a user and at least one second device label being different from any of the at least one device label of the first use-case, and executing the step of activating the selected second use-case for all network devices having the second use-case label and at least one of the at least one second device label.

17. The method according to claim 1, wherein the method is distributed over different locations, the different locations comprising at least a main location, and a remote site, wherein more than one secondary display of the plurality of secondary displays are located at any of the main location and the remote site, and wherein the unmodified digital interactive dialog window is without further modification of the digital interactive dialog window after the selection has been made, and is launched onto the secondary display as-is in the way it is defined in the back end, and the method further comprising sending user specific results and statistics in the context of results and statistics for all participants to all participants.

18. A system for creating arrangements of a digital interactive dialog window for use as determined by use cases, with a network having a first display device of a first network device having a first device label being associated with a first set of credentials and displaying a first web browser content on a first web browser, the first web browser content being first content from a back end accessed by the first set of credentials, the first network device being associated with a selection menu comprising a set of digital interactive dialog window types, the back end being a process or combination of processes that is adapted to run on a web server hardware, the system comprising:
 a plurality of secondary network devices each having a secondary display device for displaying a second web content on a second web browser and having a second label, and being adapted to receive second content from the back end accessed by a second set of credentials, the secondary network devices being in communication with or connected to the network, the first network device and the second network devices being selected for a selected use case based on the label carried by the first network device and/or the secondary network devices, wherein only the first network device and/or the secondary network devices with the respective labels will be selected for the selected use case, and
 for a selected digital interactive dialog window, the secondary network device being configured to display an arrangement of an unmodified digital interactive dialog window corresponding to the selected digital interactive dialog window type combined with, juxtaposed with or overlaid onto the second web browser content shown on each of the secondary network devices.

19. The system according to claim 18, wherein for each arrangement, the digital interactive dialog window overlaps the second web browser content with 1 to 100 percent.

20. The system according to claim 18, wherein each of the more than one secondary display devices has a display area and for each arrangement, the second web browser content fully covers the display area.

21. The system according to claim 18, wherein for each arrangement, the back end is deployed in the cloud or on-premises.

22. The system according to claim 18, wherein for each arrangement, the back end comprises a database optionally for content, results, user information, statistics.

23. The system according to claim 18, wherein for each arrangement, the interactive dialog window is any of a poll, a chat, voting buttons, voting sliders, text input fields.

24. A non-transitory computer program product which when executed on a processing engine performs a method according to claim 1.

* * * * *